US012557944B2

(12) United States Patent
Kim

(10) Patent No.: US 12,557,944 B2
(45) Date of Patent: Feb. 24, 2026

(54) BLENDER HAVING AUTOMATICALLY OPENING AND CLOSING COVER

(71) Applicant: NUC Electronics Co., Ltd., Daegu (KR)

(72) Inventor: Jong Boo Kim, Daegu (KR)

(73) Assignee: NUC Electronics Co., Ltd., Daegu (KR)

( * ) Notice: Subject to any disclaimer, the term of this patent is extended or adjusted under 35 U.S.C. 154(b) by 243 days.

(21) Appl. No.: 17/921,601

(22) PCT Filed: Sep. 17, 2021

(86) PCT No.: PCT/KR2021/012792

§ 371 (c)(1),
(2) Date: Oct. 26, 2022

(87) PCT Pub. No.: WO2022/085960

PCT Pub. Date: Apr. 28, 2022

(65) Prior Publication Data

US 2023/0320532 A1 Oct. 12, 2023

(30) Foreign Application Priority Data

Oct. 22, 2020 (KR) ........................ 10-2020-0137233

(51) Int. Cl.
*A47J 43/00* (2006.01)
*A47J 43/07* (2006.01)
*A47J 43/08* (2006.01)

(52) U.S. Cl.
CPC ......... *A47J 43/0772* (2013.01); *A47J 43/085* (2013.01)

(58) Field of Classification Search
CPC ............................ A47J 43/0772; A47J 43/085
See application file for complete search history.

(56) References Cited

U.S. PATENT DOCUMENTS

| | | | |
|---|---|---|---|
| 6,390,321 | B1 | 5/2002 | Wang |
| 8,087,603 | B2 | 1/2012 | Kolar |
| 10,321,786 | B2 | 6/2019 | Kim |
| 2002/0176320 | A1 | 11/2002 | Wulf et al. |
| 2018/0132664 | A1 | 5/2018 | Kim |
| 2018/0310769 | A1* | 11/2018 | Kim .................... A47J 43/0716 |
| 2019/0133378 | A1 | 5/2019 | Kim |

(Continued)

FOREIGN PATENT DOCUMENTS

| | | |
|---|---|---|
| CN | 101135218 A | 3/2008 |
| CN | 201438795 U | 4/2010 |
| CN | 102190144 A | 9/2011 |

(Continued)

OTHER PUBLICATIONS

International Search Report, dated Dec. 29, 2021, for International Patent Application No. PCT/KR2021/012792. (2 pages). (English translation.).

*Primary Examiner* — Anshu Bhatia
(74) *Attorney, Agent, or Firm* — Seed Intellectual Property Law Group LLP

(57) ABSTRACT

Disclosed herein is a soundproof blender having an automatic cover. The blender includes: a main body on which a container receiving a processing object is seated; and a cover disposed to surround at least a portion of the container, wherein the cover automatically opens or closes at least a portion of the container.

16 Claims, 20 Drawing Sheets

(56) References Cited

U.S. PATENT DOCUMENTS

| | | | |
|---|---|---|---|
| 2021/0393081 A1* | 12/2021 | Kennedy | A47J 43/085 |
| 2022/0087479 A1* | 3/2022 | Hilgers | A47J 43/0772 |

FOREIGN PATENT DOCUMENTS

| | | | |
|---|---|---|---|
| CN | 105155959 | A | 12/2015 |
| CN | 108065810 | A | 5/2018 |
| CN | 108784433 | A | 11/2018 |
| CN | 208463831 | U | 2/2019 |
| CN | 210114360 | U | 2/2020 |
| JP | 1975139871 | U1 | 5/1974 |
| JP | 2002360452 | A | 12/2002 |
| JP | 2011244910 | A | 12/2011 |
| JP | 2012500042 | A | 1/2012 |
| JP | 2012100794 | A | 5/2012 |
| JP | 2018079293 | A | 5/2018 |
| JP | 2019516418 | A | 6/2019 |
| KR | 10-2011-0044904 | A | 5/2011 |
| KR | 20-2013-0001629 | U | 3/2013 |
| KR | 10-1878304 | B1 | 7/2018 |
| KR | 10-2019-0051754 | A | 5/2019 |
| WO | WO 2018199650 | A1 | 11/2018 |

* cited by examiner

【FIG. 1】
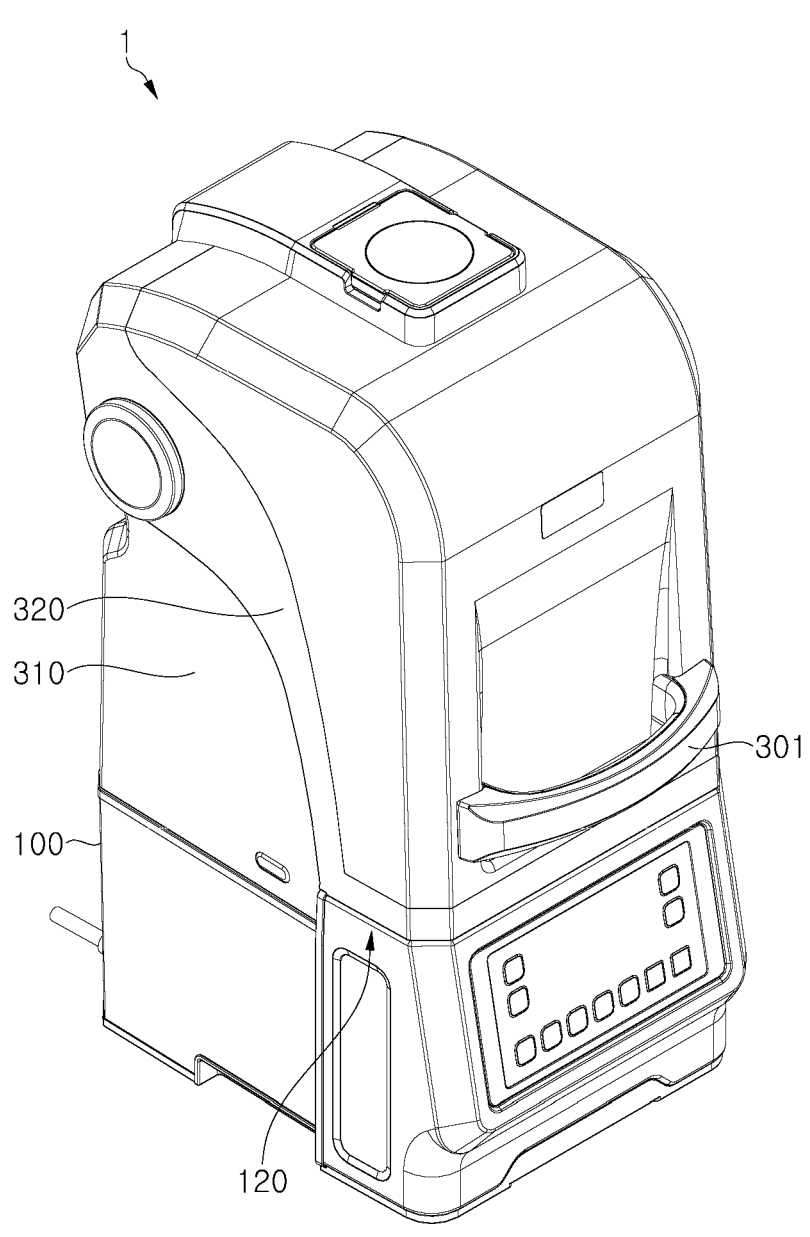

【FIG. 2】
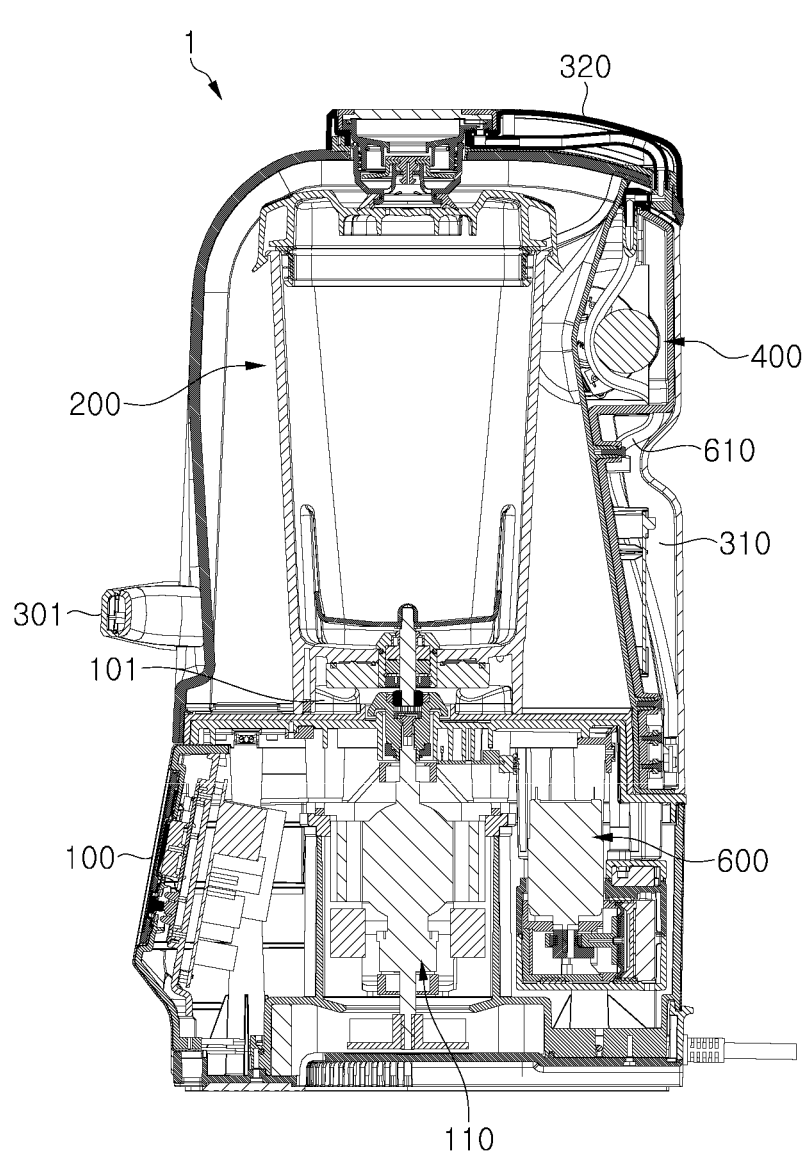

【FIG. 3a】
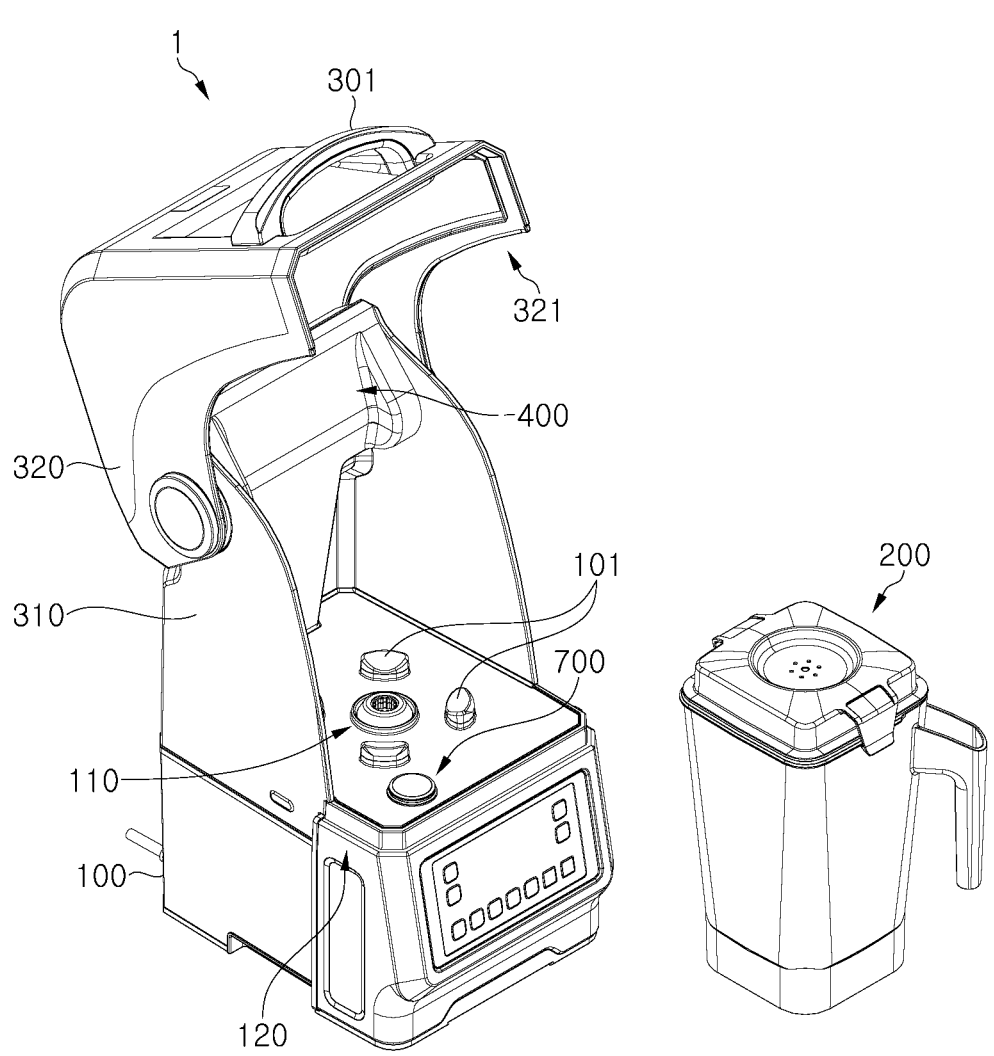

【FIG. 3b】
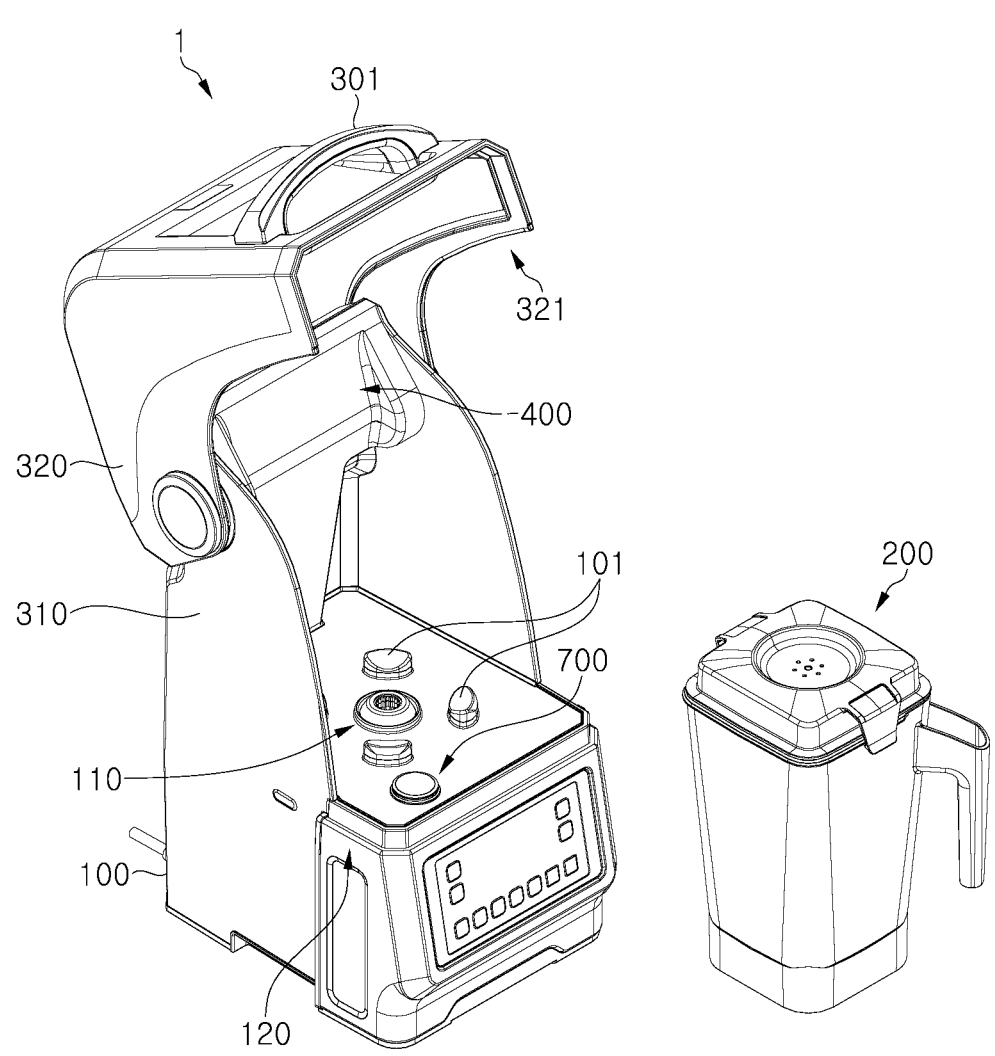

【FIG. 4】
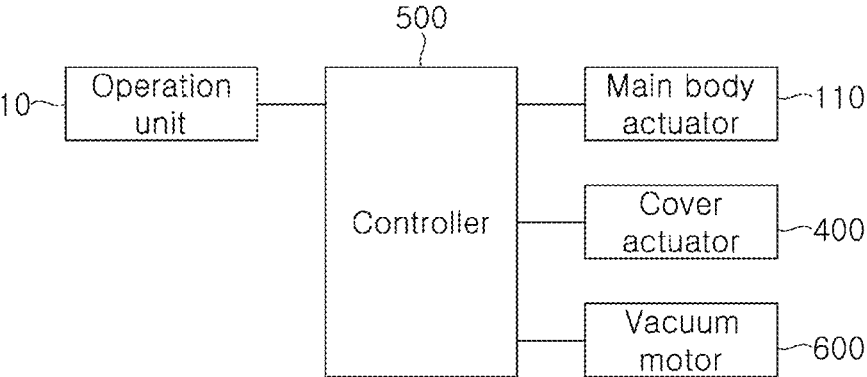
【FIG. 5】
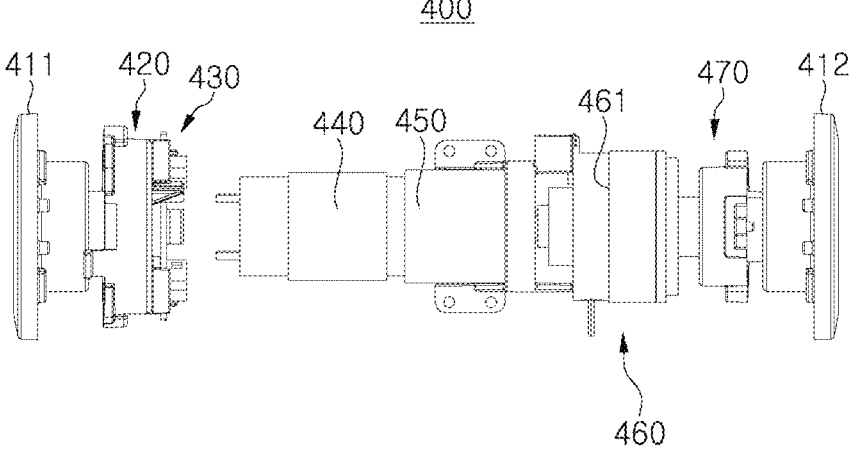
【FIG. 6】
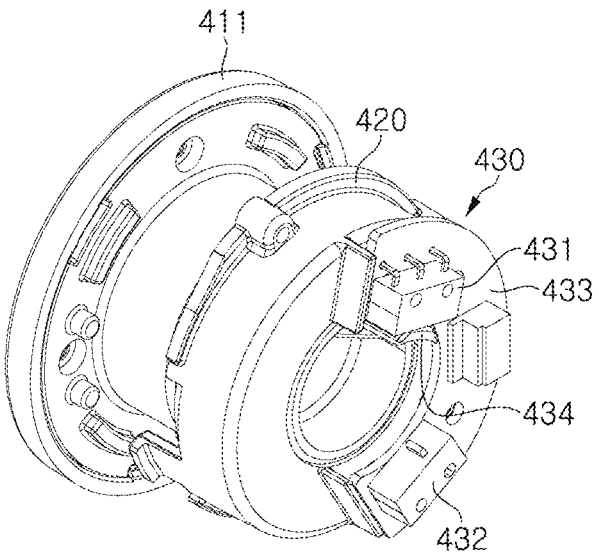

【FIG. 7】
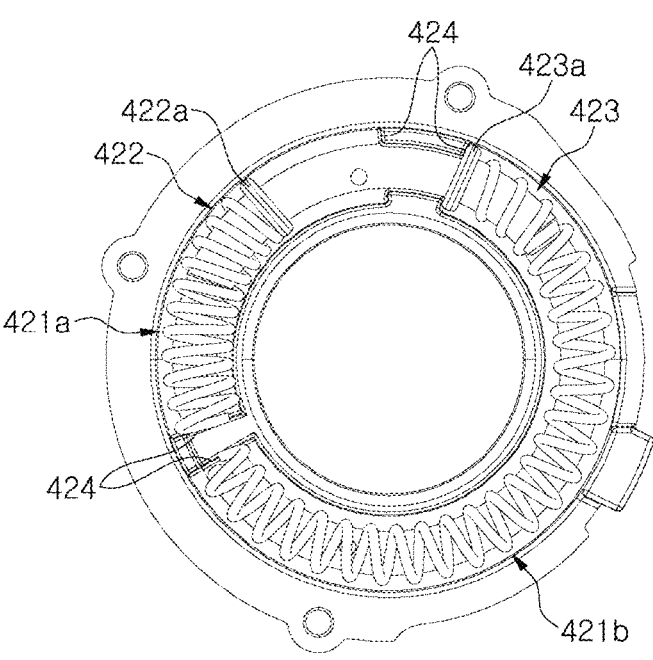
【FIG. 8】
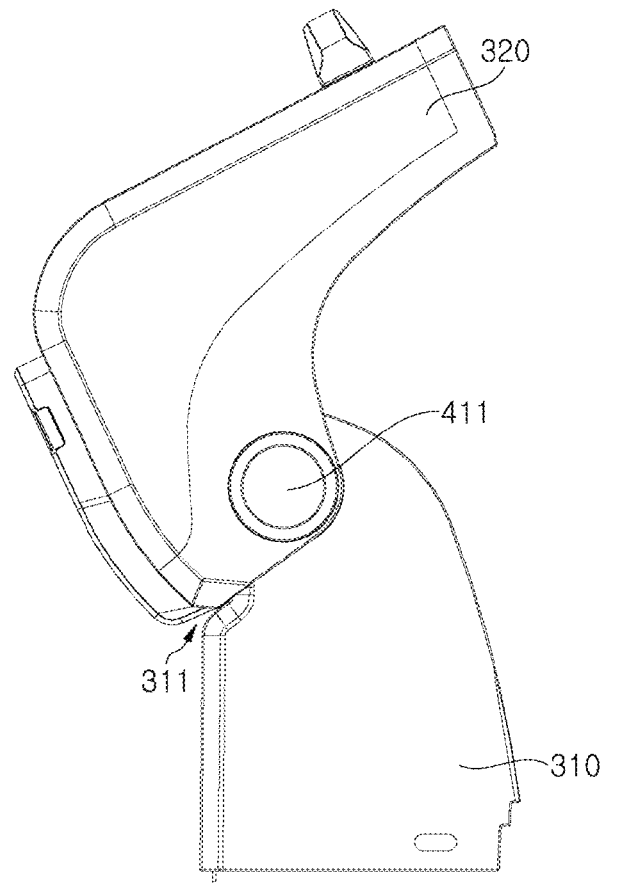

【FIG. 9】
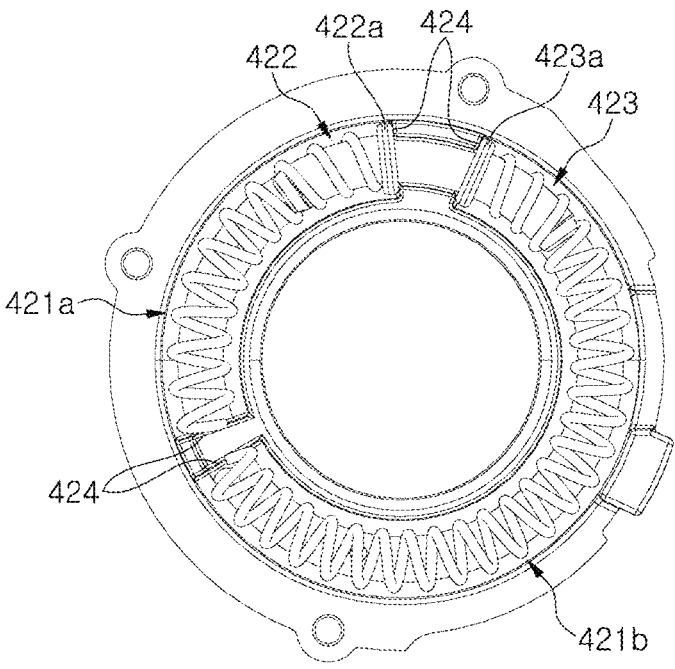
【FIG. 10】
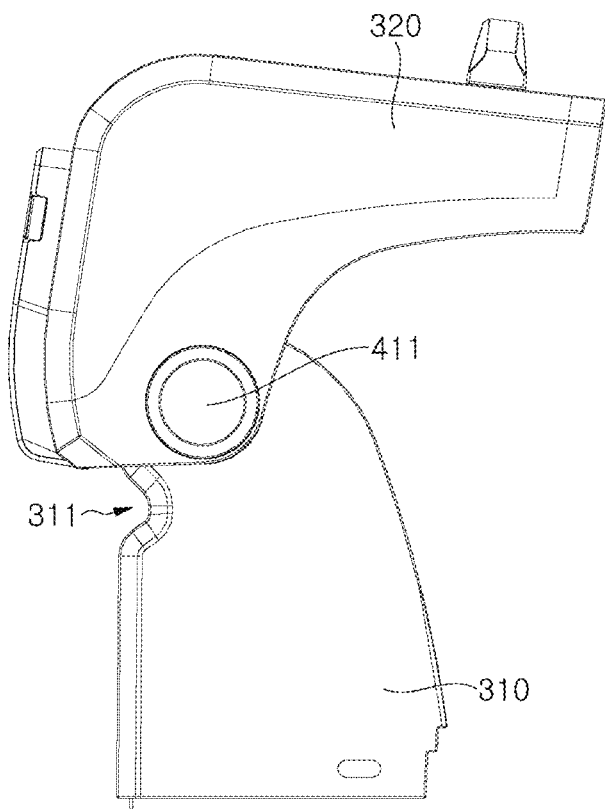

【FIG. 11】
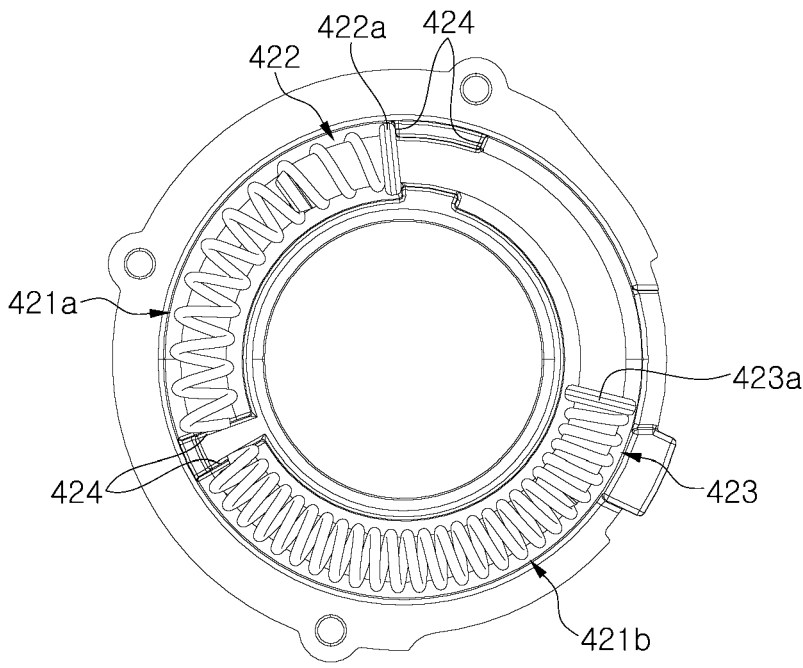
【FIG. 12】
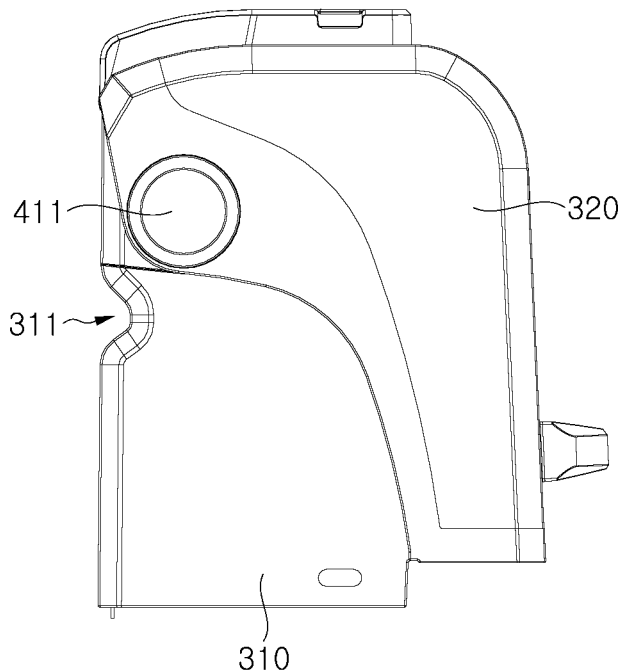

【FIG. 13】
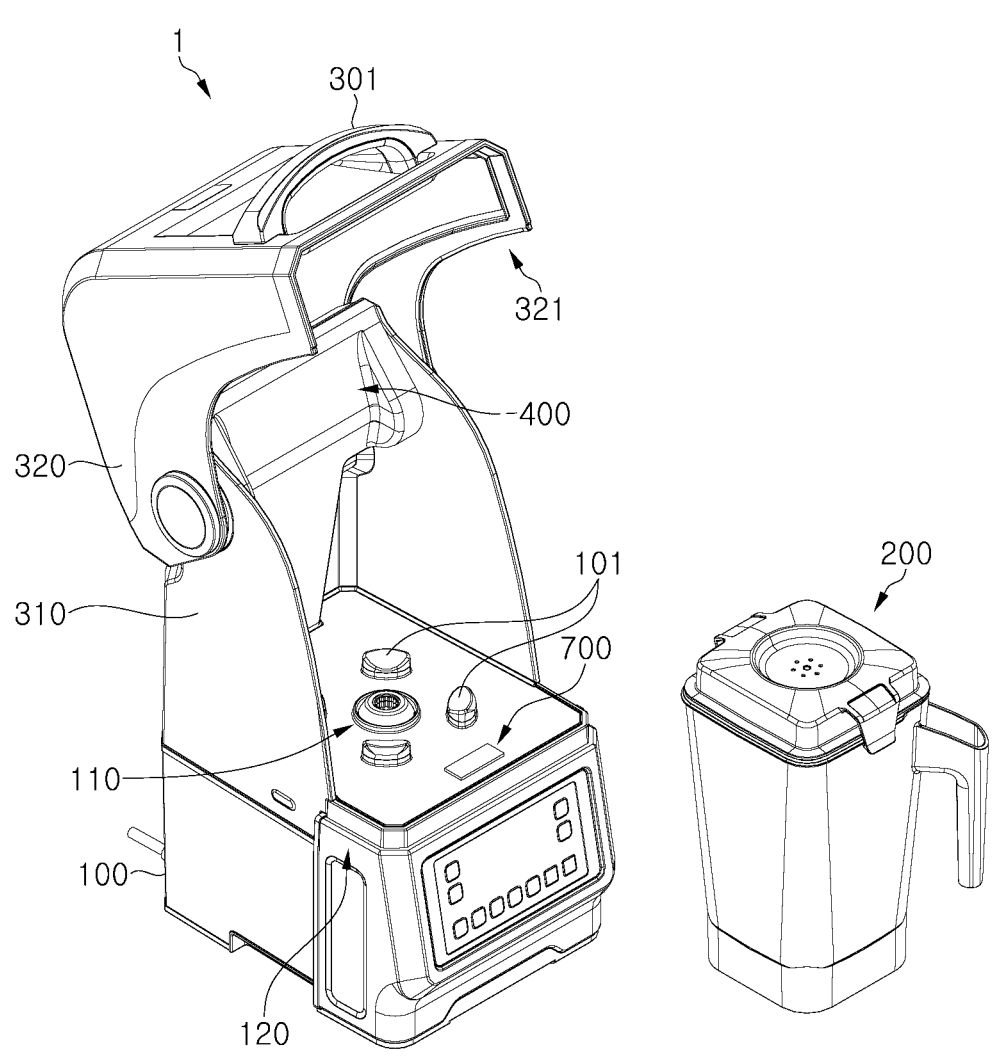

【FIG. 14】
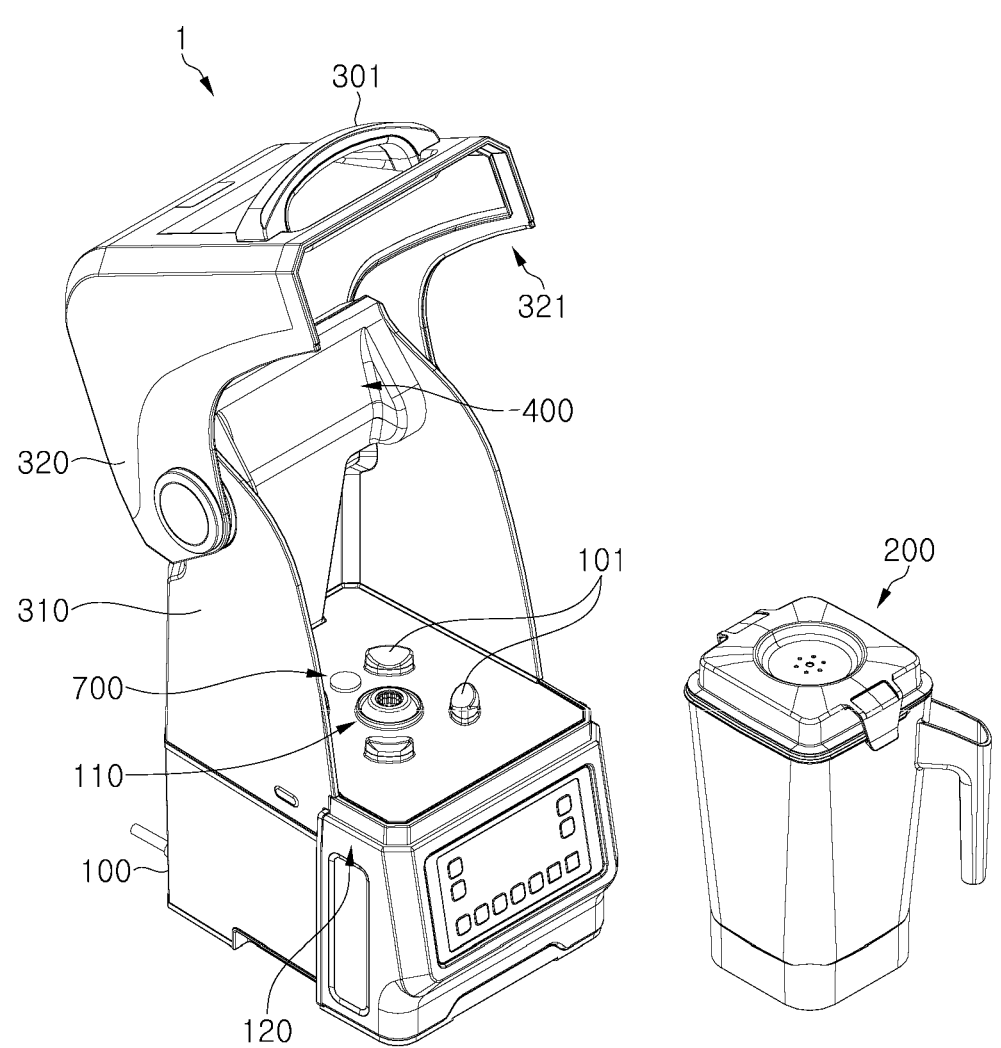

【FIG. 15】
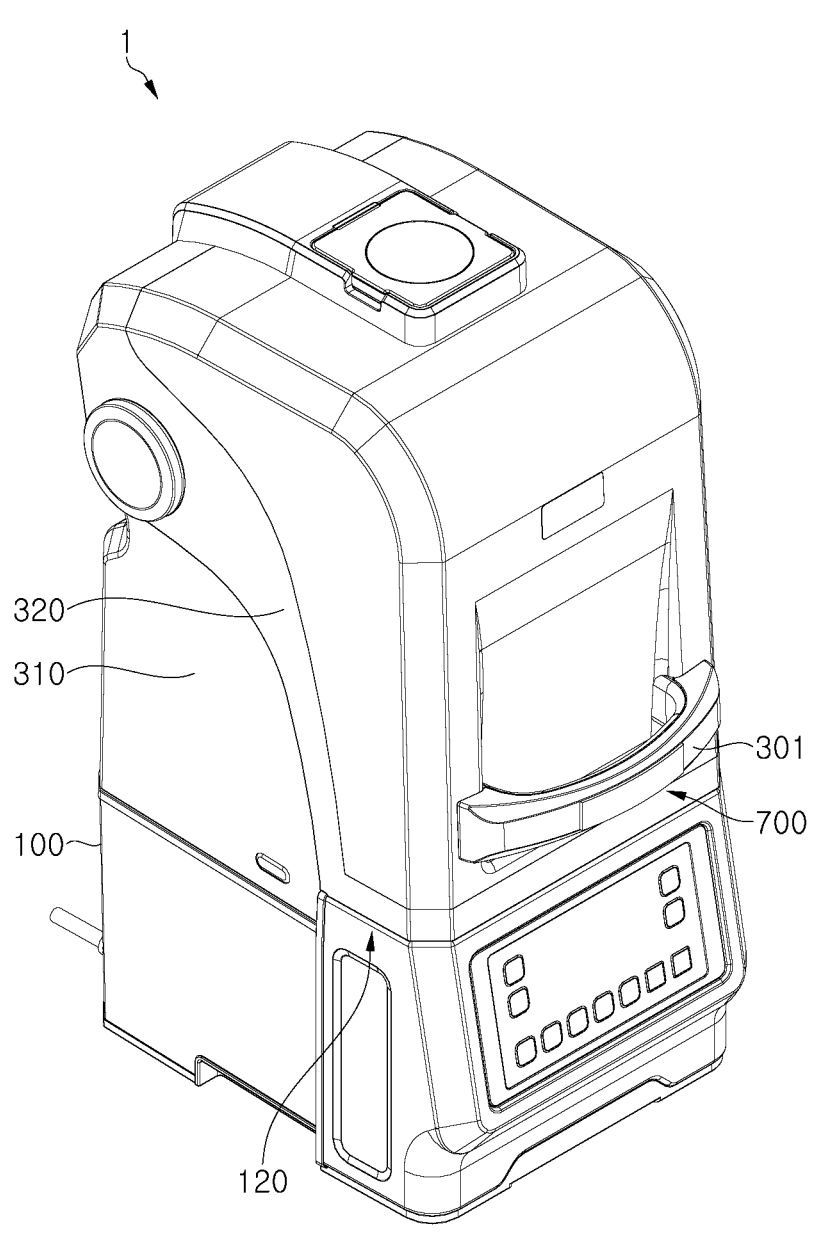

【FIG. 16】
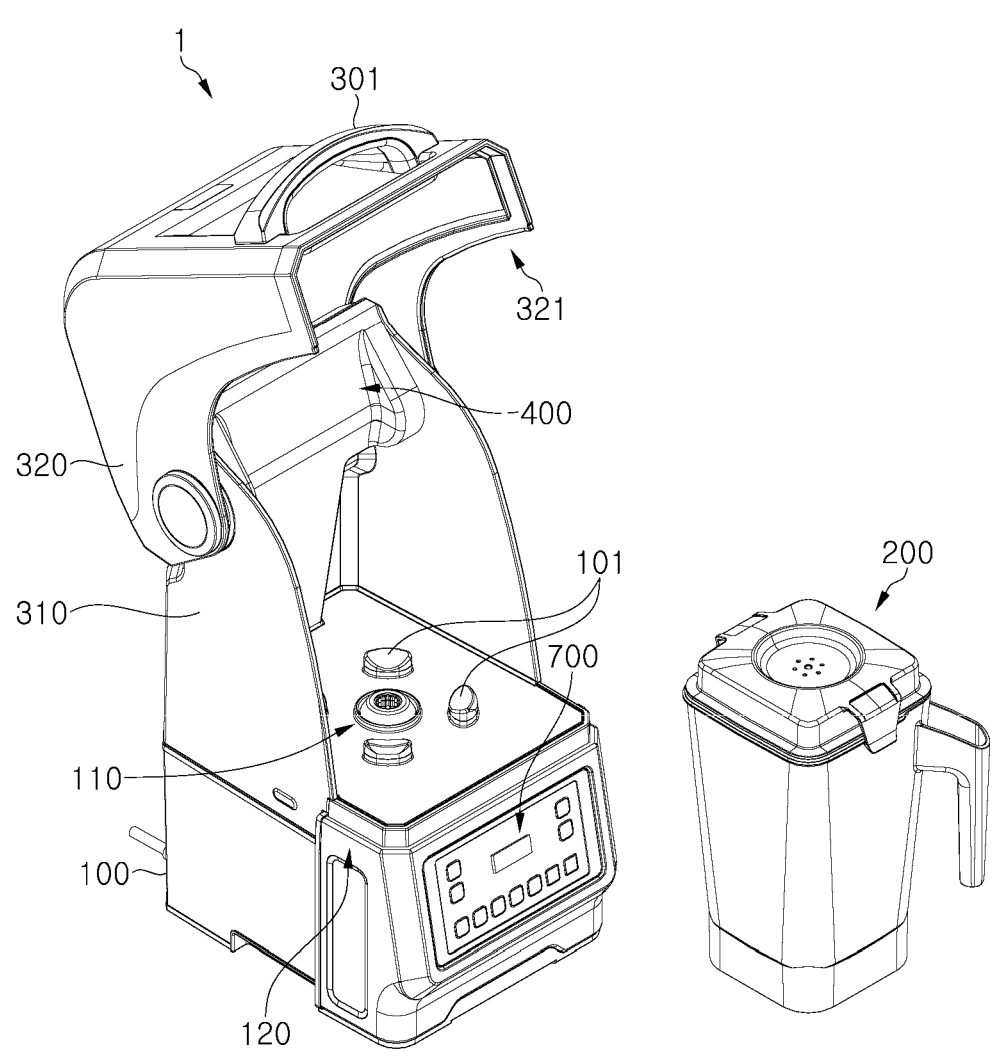

【FIG. 17】
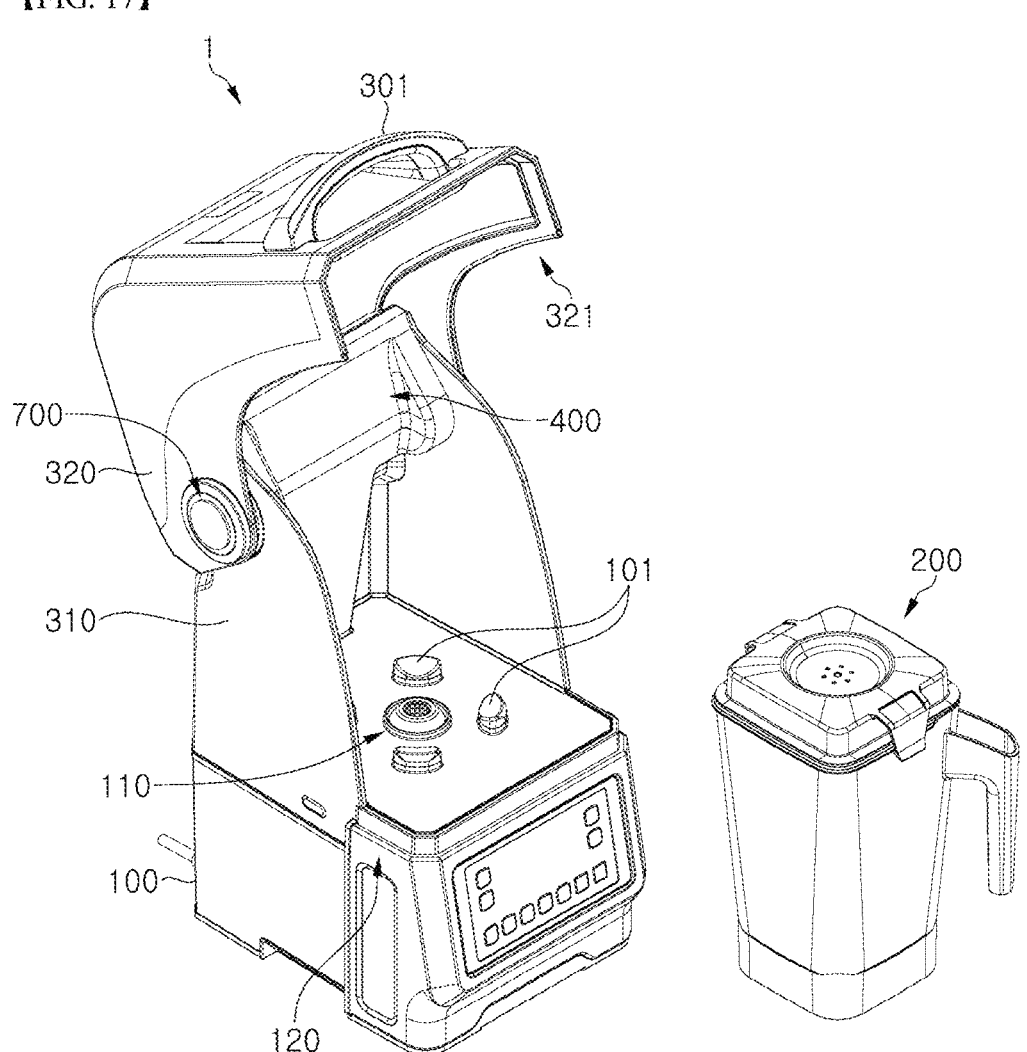
【FIG. 18】
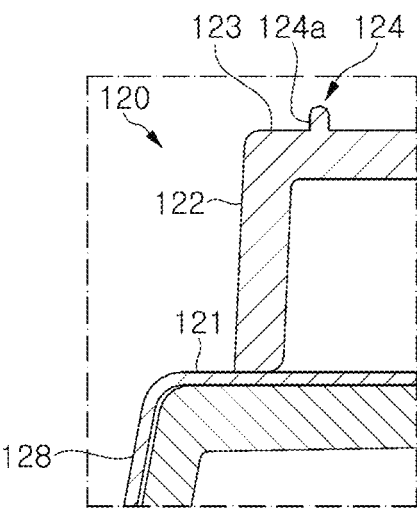

【FIG. 19】
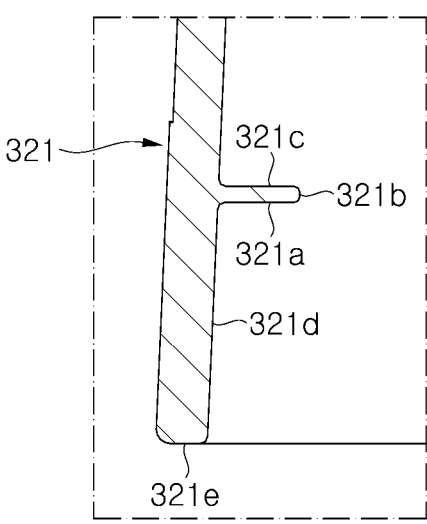
【FIG. 20】
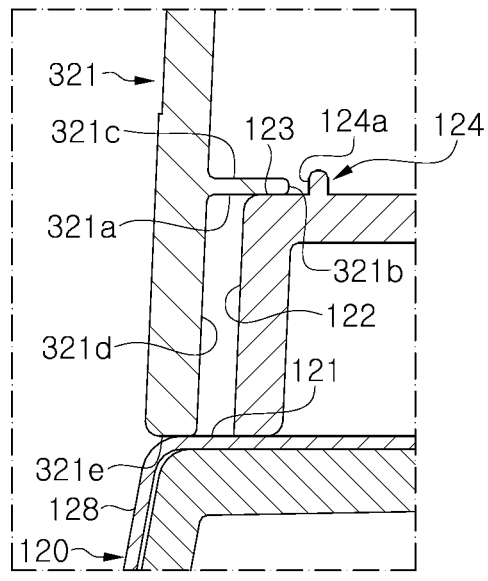

【FIG. 21】
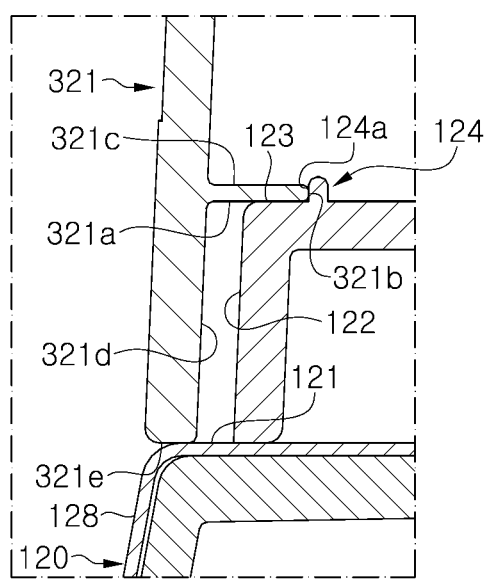
【FIG. 22】
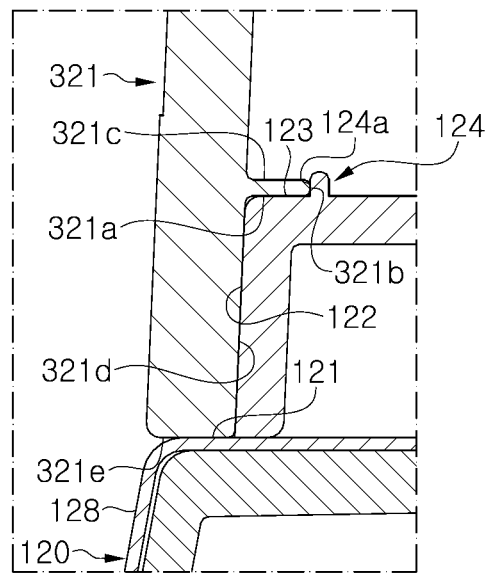

【FIG. 23a】
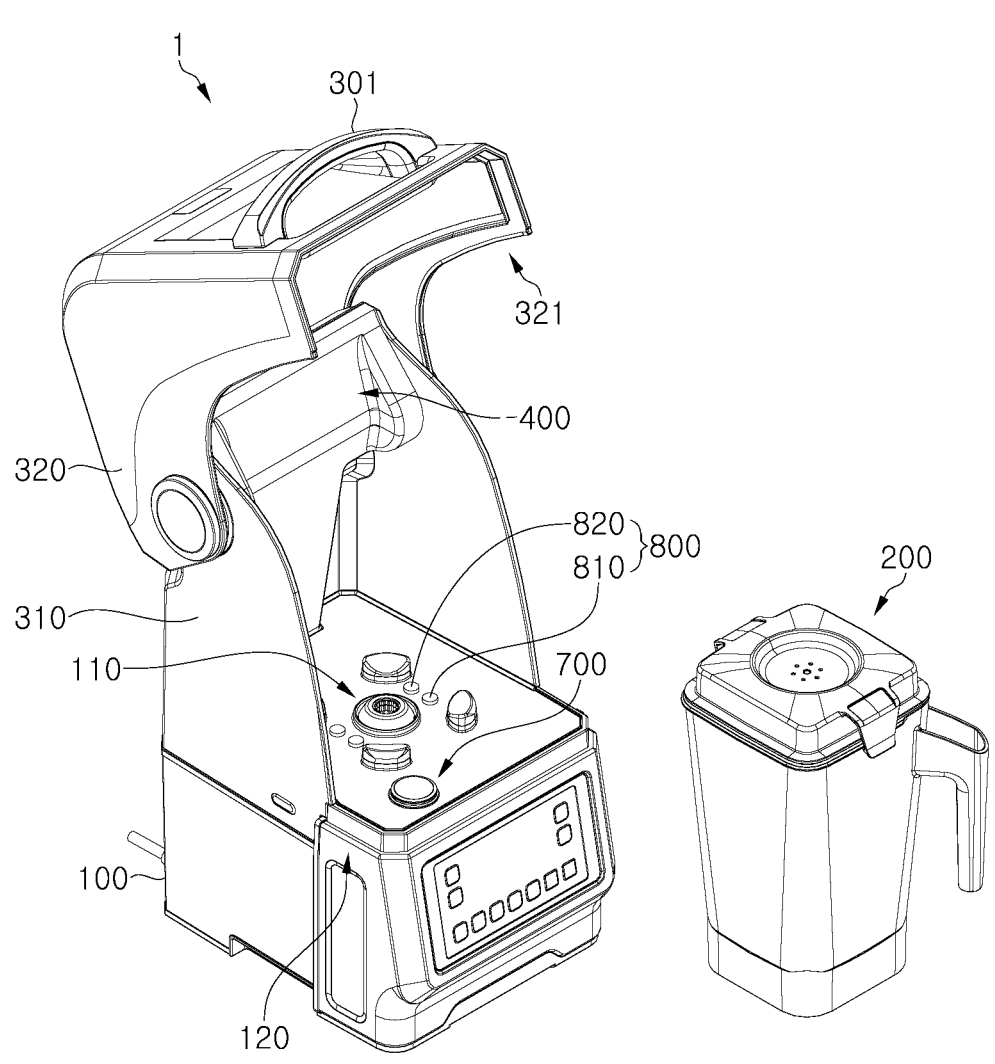

【FIG. 23b】
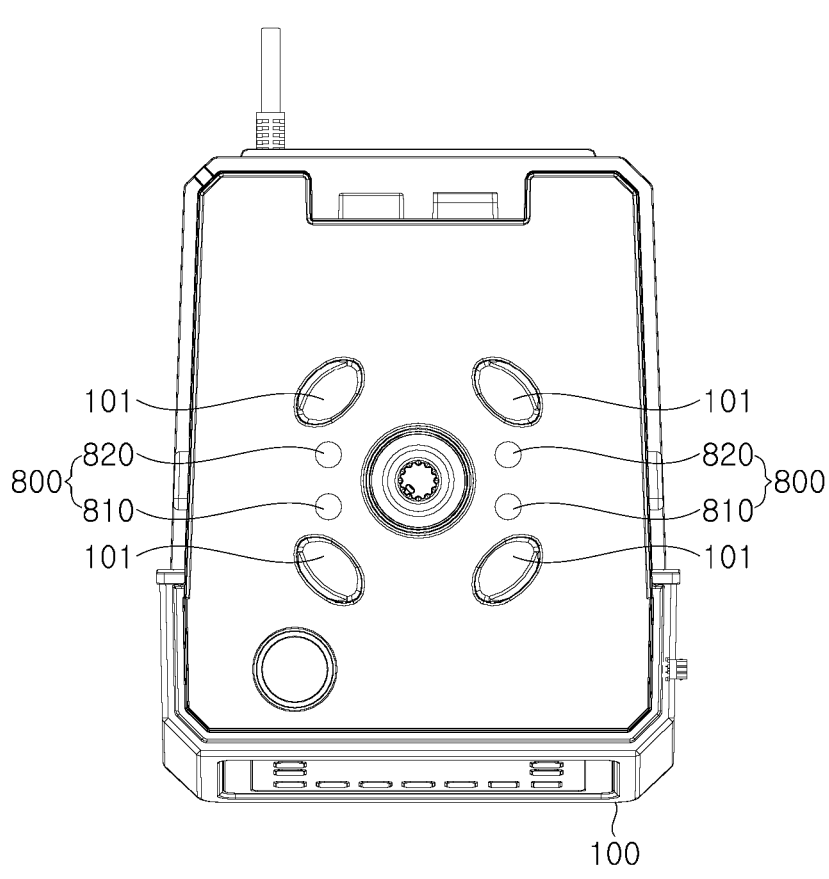

【FIG. 24】
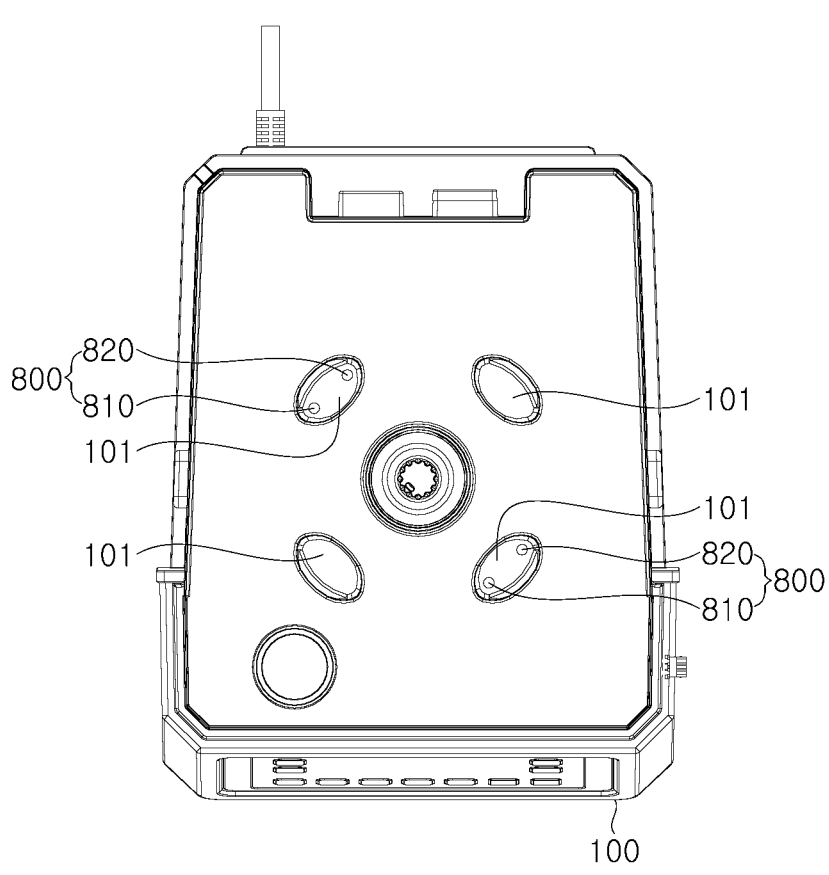

【FIG. 25】
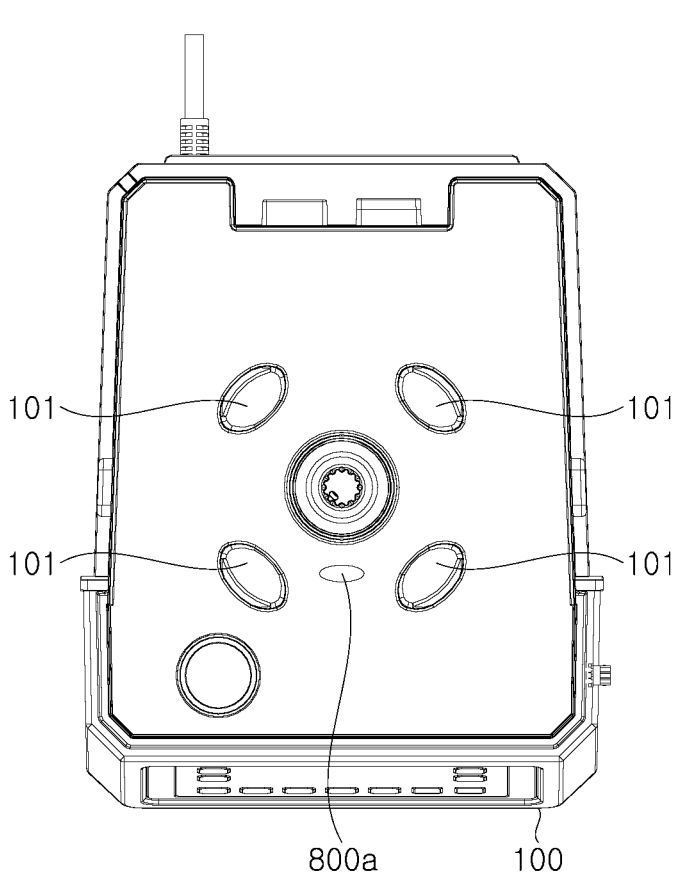

【FIG. 26】
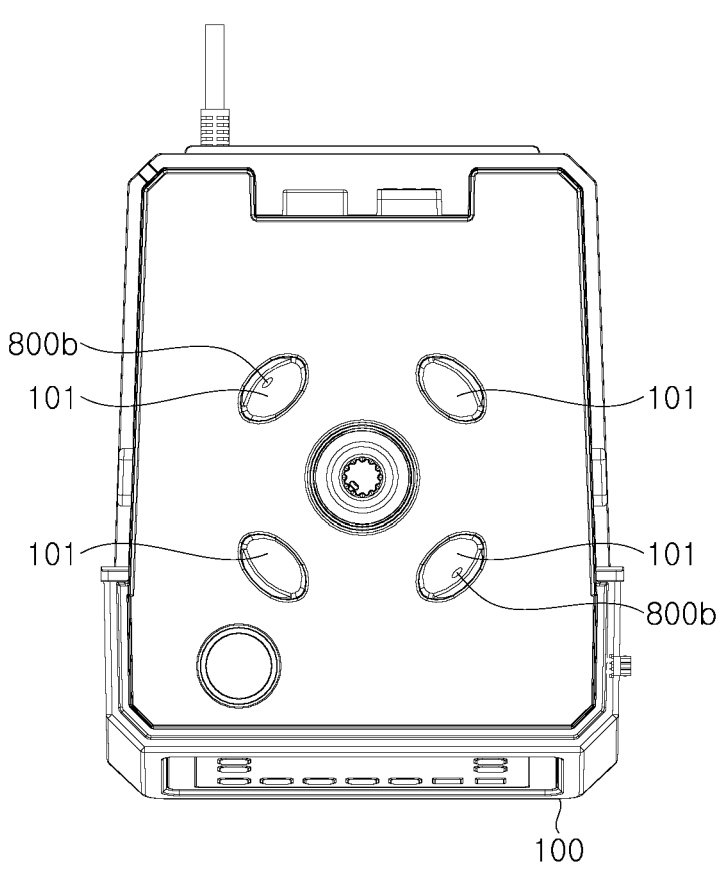

BLENDER HAVING AUTOMATICALLY OPENING AND CLOSING COVER

TECHNICAL FIELD

The present disclosure relates to a blender having an automatic cover and, more particularly, to a blender having an automatic cover, which can effectively prevent noise generation while having a compact structure and allows easy checking as to whether a food processing operation is finished, quick removal of a container, and prevention of safety-related accidents during a cover opening/closing operation due to a user's hand getting caught by a cover during closing of the cover or due to occurrence of an error such as overload during the food processing operation through establishment of connection between the food processing operation and the cover opening/closing operation, thereby significantly increasing user safety and convenience.

DESCRIPTION OF THE RELATED ART

In general, a blender is an electrical appliance for processing (for example, mixing or chopping) foods, and may process foods in a container mounted on an upper side of a main body by rotating a processing member (for example, a blade) rotatably disposed in the container through torque transmission from a motor disposed in the main body to the processing member.

Such a blender may include various noise generating sources. For example, a loud noise can be generated during operation of a mechanism of transmitting driving force from the motor to the processing member or due to collision of foods in the container with the processing member and an inner wall of the container. Such noise is loud enough to interrupt conversations between a user and surrounding people and creation of pleasant surroundings, and thus needs to be blocked.

Conventionally, a soundproof cover has been used in food processors or blenders used in the food and beverage manufacturing industry.

A typical soundproof cover for blenders is used to minimize noise generated during food processing.

Such a soundproof cover is used mainly in commercial facilities such as restaurants, cafes, and cocktail lounges to reduce distractions and customer discomfort.

When a blender is used in a commercial facility such as a restaurant or cafe, a user has to manually open or close the cover for food processing. However, this process requires many time-consuming manual operations, thus causing increase in user fatigue.

In addition, such a typical blender has a problem in that it is difficult to confirm by sound whether food processing is finished in a noisy home or commercial facility and it is also difficult to visually confirm whether food processing is finished.

BRIEF SUMMARY

Technical Problem

Embodiments of the present invention are conceived to solve such a problem in the art and provide a blender having an automatic cover, which can effectively prevent noise generation while having a compact structure and allows easy checking as to whether a food processing operation is finished, quick removal of a container, and prevention of safety-related accidents during a cover opening/closing operation due to a user's hand getting caught by a cover during closing of the cover or due to occurrence of an error such as overload during the food processing operation through establishment of connection between the food processing operation and the cover opening/closing operation, thereby significantly increasing user safety and convenience when used in a home or commercial facility.

Technical Solution

In accordance with an aspect of the present invention, there is provided a soundproof blender having an automatic cover, the blender including: a main body on which a container receiving a processing object therein is seated; and a cover disposed to surround at least a portion of the container, wherein the cover automatically opens or closes at least a portion of the container.

Advantageous Effects

The blender according to the present invention can effectively prevent noise generation while having a compact structure and allows easy checking as to whether a food processing operation is finished and safe and quick removal of the container through establishment of connection between the food processing operation and a cover opening/closing operation, thereby significantly increasing user convenience.

BRIEF DESCRIPTION OF THE SEVERAL VIEWS OF THE DRAWINGS

FIG. 1 is a perspective view of a blender having an automatic cover according to one embodiment of the present invention, FIG. 2 is a side sectional view of the blender of FIG. 1, and FIG. 3 is a view of the blender of FIG. 1, with the cover in an open position.

FIG. 4 is a block diagram illustrating operation control of the blender according to one embodiment of the present invention.

FIG. 5 is a view of a cover actuator according to one embodiment of the present invention.

FIG. 6 is a view of an opening/closing detection member according to one embodiment of the present invention.

FIG. 7 to FIG. 12 are views illustrating operation of a torque supplementation member according to one embodiment of the present invention. FIG. 7 and FIG. 8 show the torque supplementation member with the cover in the open position, FIG. 9 and FIG. 10 show the torque supplementation member with the cover placed in an inflection region, and FIG. 11 and FIG. 12 show the torque supplementation member with the cover in the closed position.

FIG. 13 to FIG. 17 are views illustrating placement of a quick switch according to various embodiments of the present invention.

FIG. 18 to FIG. 22 show a main body stepped portion and a cover stepped portion according to one embodiment of the present invention. FIG. 18 is a view of the main body stepped portion, FIG. 19 is a view of the cover stepped portion, and FIG. 20 to FIG. 22 are views illustrating coupling between the main body stepped portion and the cover stepped portion according to various embodiments of the present invention.

FIG. 23 to FIG. 26 show a container recognition device according to various embodiments of the present invention.

DETAILED DESCRIPTION

Hereinafter, embodiments of the present invention will be described in detail. It should be understood that the present invention is not limited to the following embodiments and may be embodied in different ways, and that the embodiments are provided for complete disclosure and thorough understanding of the present invention by those skilled in the art.

It will be understood that, when an element such as a layer, film, region or substrate is referred to as being placed "on" or "under" another element, it can be directly placed on the other element, or intervening layer(s) may also be present. In addition, spatially relative terms, such as "upper" and "lower," are defined from the observer's point of view, and, when the observer's point of view is changed, "upper (portion)" may mean "lower (portion)," or vice versa.

It will be noted that like components will be denoted by like reference numerals throughout the specification and the accompanying drawings. In addition, it will be understood that the terms "includes", "comprises", "including", and/or "comprising" when used in this specification, specify the presence of stated features, steps, operations, elements, and/or components, but do not preclude the presence or addition of one or more other features, steps, operations, elements, components, and/or groups.

As used herein, the expression "a cover is in an open position" means that the cover is seated on a recess, and the cover may be considered to be in the open position when an opening/closing detection member detects that the cover is rotated by an angle predetermined by a user in a direction of opening the cover.

As used herein, the expression "the cover is in a closed position" means that a lower surface of the cover is seated on an upper portion of a main body and/or an upper surface of a cover mount, and the cover may be considered to be in the closed position when the opening/closing detection member detects that the cover is rotated by an angle predetermined by a user in a direction of closing the cover.

As used herein, the term "opening operation" refers to an operation of rotating the cover to the open position and the term "closing operation" refers to an operation of rotating the cover to the closed position. In addition. "opening/closing operation" includes both the "opening operation" and the "closing operation".

In accordance with one aspect of the present invention, there is provided a soundproof blender having an automatic cover, the blender including: a main body on which a container receiving a processing object therein is seated; and a cover disposed to surround at least a portion of the container, wherein the cover automatically opens or closes at least a portion of the container.

In one embodiment, the blender may further include: a main body actuator disposed inside the main body and providing power for processing the processing object inside the container; a cover actuator controlling an opening/closing operation of the cover; and a controller controlling the main body actuator and the cover actuator in an operatively connected manner.

Here, the controller may control at least one of: a first operation including moving the cover to a closed position and initiating a processing operation inside the container by operating the cover actuator and the main body actuator; and a second operation including moving the cover to an open position in response to completion of the processing operation through control over operation of the main body actuator and the cover actuator.

Here, the controller may initiate an opening operation of the cover when a closing operation of the cover is stopped for a preset amount of time during the first operation before the cover is completely closed.

In addition, the controller may initiate the second operation when at least one of the following occurs: operation of the main body actuator is completed while meeting preset requirements; and an error is detected during operation of the main body actuator.

In one embodiment, the blender may further include: a vacuum motor controlling a vacuum in an internal space of the container, wherein the first operation may further include initiating the processing operation inside the container after the cover is moved to the closed position and the internal space of the container is switched to a vacuum state, and the second operation may further include initiating opening operation of the cover after the processing operation inside the container is completed and operation of the vacuum motor is completed.

In one embodiment, the blender may further include a quick switch transmitting a signal for initiating at least one of the first operation and the second operation to the controller.

Here, the quick switch may include a one-touch button transmitting a signal by detecting a user's touch, a voice recognition device transmitting a signal by detecting a user's voice, and a container recognition device detecting whether the container is seated on the main body.

In accordance with another aspect of the present invention, there is provided a soundproof blender having an automatic cover, the blender including: a main body on which a container receiving a processing object therein is seated; and a cover disposed to surround at least a portion of the container, wherein the cover automatically opens or closes a space defined between the main body and a cover mount disposed at an upper portion of the main body and includes a cover stepped portion formed on a surface thereof adjoining the main body, the main body includes a main body stepped portion formed on a surface thereof adjoining the cover, and the cover stepped portion and the main body stepped portion correspond in shape to each other to isolate a space defined by the cover from an outside environment when the cover is in a closed position.

Here, the cover stepped portion may include a first bent portion protruding from an inner surface of the cover, a second bent portion bent upward from the first bent portion, and a third bent portion extending from the second bent portion toward the inner surface of the cover, and the main body stepped portion may include a first main body bent portion bent from an outer surface of the main body toward a center of the main body, a second main body bent portion bent upward from the first main body bent portion, a third main body bent portion bent from the second main body bent portion toward the center of the main body, and a main body protrusion protruding upward from the third main body bent portion, wherein the first bent portion adjoins the third main body bent portion when the cover is in the closed position.

When the cover is in the closed position, a lower surface of the cover may be seated on the first main body bent portion.

When the cover is in the closed position, the first bent portion may adjoin an upper surface of the cover mount to isolate the space defined by the cover from the outside environment.

The cover mount may include a recess formed on an outer surface thereof such that at least a portion of the cover is seated on the recess when the cover is in an open position.

In accordance with a further aspect of the present invention, there is provided a soundproof blender having an automatic cover, the blender including: a main body on which a container receiving a processing object therein is seated; a cover automatically opening or closing a space defined between the main body and a cover mount disposed on an upper side of the main body; a cover actuator controlling an opening/closing operation of the cover; and a controller controlling operation of the cover actuator, wherein the cover actuator includes: a rotary body coupled to the cover to be rotatable in association with the opening/closing operation of the cover; an opening/closing detection member detecting opening/closing of the cover; and a motor generating power to be transmitted to the rotary body.

Here, the opening/closing detection member may include at least one rotation sensor to detect opening/closing of the cover based on the degree of rotation of the rotary body.

In one embodiment, the cover actuator may further include: a motor gearbox connected to the motor to control the power of the motor transmitted to the rotary body; and a transmission member disposed between the rotary body and the motor gearbox to transmit the power of the motor to the rotary body, wherein the controller may control whether to transmit the power of the motor to the rotary body through control over the transmission member.

Here, the rotary body may include a first rotary body and a second rotary body, wherein the first rotary body is spaced apart from the transmission member of the cover actuator and the second rotary body is connected to the transmission member such that the power of the motor is transmitted to the second rotary body.

Here, the opening/closing detection member may be connected to the first rotary body of the cover actuator.

The cover actuator may further include a torque supplementation member supplementing the power of the motor during the opening/closing operation of the cover.

Here, the torque supplementation member may include at least one elastic body, wherein, when the cover is in the open position or the closed position, the elastic body is maintained in a compressed position and, during the opening/closing operation of the cover, the elastic body is released from the compressed position.

Here, the torque supplementation member may include an inflection region defined as a compression position of the elastic body in which the cover is maintained in a stationary position between the open position and the closed position of the cover. When the compression position of the elastic body is out of the inflection region, the rotary body may be rotated to move the cover to the open position or the closed position.

In accordance with yet another embodiment of the present invention, there is provided a soundproof blender having an automatic cover, the blender including: a main body in which a container receiving a processing object therein is seated; a main body actuator disposed inside the main body and providing power for processing the processing object inside the container; a cover opening or closing a space defined between the main body and a cover mount disposed on an upper side of the main body; a cover actuator controlling an opening/closing operation of the cover; and a controller controlling the main body actuator and the cover actuator in an operatively connected manner, wherein the cover actuator includes: a rotary body coupled to the cover to be rotatable in association with the opening/closing operation of the cover; an opening/closing detection member detecting opening/closing of the cover; and a motor generating power to be transmitted to the rotary body.

Here, the controller may control a first operation including: operating the motor to rotate the rotary body; and operating the main body actuator to initiate a processing operation inside the container in response to detecting, by the opening/closing detection member, that the cover is in the closed position.

When the closing operation of the cover is stopped for a preset amount of time during the first operation before the cover is detected to be in the closed position by the opening/closing detection member, the controller may operate the motor to rotate the rotary body until the cover is detected to be in the open position by the opening/closing detection member.

In addition, when at least one of the following occurs: the first operation is completed while meeting preset requirements; and an operational error of the main body actuator is detected, the controller may control a second operation including stopping operation of the main body actuator and operating the motor to rotate the rotary body until the cover is detected to be in the open position by the opening/closing detection member.

The blender may further include a vacuum motor controlling a vacuum in the internal space of the container, wherein the first operation may further include operating the main body actuator to initiate the processing operation inside the container when the cover is detected to be in the closed position by the opening/closing detection member and the internal space of the container is detected to be in a vacuum state, and the second operation may further include stopping operation of the main body actuator and operating the motor to rotate the rotary body until the cover is detected to be in the open position by the opening/closing detection member upon occurrence of at least one of the following: the first operation is completed while meeting preset requirements; and an operational error of the main body actuator is detected and upon detecting that operation of the vacuum motor is completed.

In addition, the blender may further include a quick switch transmitting a signal for initiating at least one of the first operation and the second operation to the controller, wherein the quick switch may include at least one selected from among a one-touch button transmitting a signal by detecting a user's touch, a voice recognition device transmitting a signal by detecting a user's voice, and a container recognition device detecting whether the container is seated on the main body.

Hereinafter, exemplary embodiments of the present invention will be described with reference to the accompanying drawings.

FIG. 1 is a perspective view of a blender having an automatic cover according to one embodiment of the present invention, FIG. 2 is a side sectional view of the blender of FIG. 1, FIG. 3 is a view of the blender of FIG. 1, with the cover in an open position, and FIG. 4 is a block diagram illustrating operation control of the blender according to one embodiment of the present invention.

Referring to FIG. 1 to FIG. 4, a blender having an automatic cover (hereinafter, a "blender" 1) includes a main body 100, a container 200, a cover mount 310, a cover 320, a main body actuator 110, a cover actuator 400, and a controller 500.

The main body 100 may include an operation unit 10 (see FIG. 4) disposed on an outer surface thereof to process a processing object (for example, ingredients) in the container 200 in response to a user operating an operation button. The operation unit 10 (see FIG. 4) may include a voice signal sensor or a communication unit communicating with a mobile app to process the processing object in the container 200 in response to a user's voice command or user input through the mobile app.

The container 200 may be seated on the main body 100. The container 200 has an internal space for receiving the processing object and includes an opening through which the processing object is introduced into the container 200. In addition, the container 200 may include a lid capable of opening/closing the opening. For example, the lid may be connected to a vacuum motor 600 described below through a vacuum hose 610 to evacuate the internal space of the container 200.

In addition, the container 200 may include a whirling blade disposed therein. The blade may be connected to the main body actuator 110 described below to process, for example, chop, the processing object in the container 200. Here, the expression "connected to the main body actuator" means that the blade is powered by a motor of the main body actuator 110.

The cover mount 310 may be at least partially disposed at an upper portion of the main body 100 to surround at least a portion of the container 200. The cover mount 310 may surround at least a portion of the container 200, for example, at least a portion of rear and lateral sides of the container 200. For example, the cover mount 310 may be detachably disposed at the upper portion of the main body 100, as shown in FIG. 3(*a*), or may be formed as a part of the main body 100, as shown in FIG. 3(*b*).

The cover mount 310 includes a recess 311 formed on an outer surface thereof and allowing the cover 320 in an open position to be at least partially seated thereon, thereby increasing the degree of rotation of the cover 320.

The cover 320 may open or close a space defined between the cover mount 310 and the main body 100 to completely surround the container 200 when the cover is in a closed position. Although an opening/closing operation of the cover 320 may be performed by, for example, detachment/attachment, folding/unfolding, or rotation of the cover 320, the present invention will be described with reference to embodiments in which the opening/closing operation of the cover 320 is performed by rotation of the cover 320. For example, when the opening/closing operation of the cover 320 is performed by rotation of the cover 320, the cover 320 may be vertically rotated with respect to the main body 100, or may be laterally rotated with respect to the main body 100.

The cover 320 may be rotated within a predetermined angle range by the cover actuator 400, a specific embodiment of which will be described below.

Accordingly, when the cover 320 is in the closed position, the container 200 can be completely surrounded by the cover mount 310 and the cover 320, thereby preventing leakage of noise generated during a processing operation in the internal space of the container 200.

Referring to FIG. 4, the blender 1 may include the controller 500, the main body actuator 110, the cover actuator 400, and the vacuum motor 600.

The main body actuator 110 may be disposed inside the main body 100 to provide power for processing the processing object inside the container 200. For example, the main body actuator 110 may include a main body actuator motor generating power for rotating the blade, a gear shaft transmitting the power, and the like.

The cover actuator 400 may control the opening/closing operation of the cover 320, details of which will be described further below.

The vacuum motor 600 may switch the internal space of the container 200 between a vacuum state and an atmospheric pressure state.

The controller 500 may control the main body actuator 110 and the cover actuator 400 in an operatively connected manner. Alternatively, the controller 500 may control the main body actuator 110, the cover actuator 400, and the vacuum motor 600 in an operatively connected manner.

For example, the controller 500 may control at least one of a first operation and a second operation.

The controller 500 may control the first operation including moving the cover to the closed position and initiating the processing operation inside the container 200 by operating the cover actuator 400 and the main body actuator 110.

In addition, the controller 500 may control the second operation including moving the cover 320 to the open position in response to completion of the processing operation inside the container 200 through control over operation of the main body actuator 110 and the cover actuator 400. For example, the controller 500 may operate the cover actuator 400 after stopping operation of the main body actuator 110, may operate the cover actuator 400 while stopping operation of the main body actuator 110, or may stop operation of the main body actuator 110 after operating the cover actuator. For example, a sequence in which the controller 500 operates the main body actuator 110 and the cover actuator 400 during the second operation may be predetermined, or may be changed by a user.

That is, when a user operates the operation unit 10 (see FIG. 4), for example, presses the operation button, inputs a voice signal, or sends a communication signal to the operation unit 10 via a user terminal, when the container 200 is detected to be seated on the main body 100 by a container recognition device described below, or when a preset amount of time elapses after the container is seated on the main body, the operation of moving the cover 320 from the open position to the closed position and the processing operation inside the container, that is, an operation of chopping ingredients with the whirling blade, may be automatically performed, thereby improving user convenience.

In addition, the controller 500 may initiate the opening operation of the cover 320 when the closing operation of the cover 320 is not completed in a preset amount of time after initiation of the first operation. For example, when the cover 320 stops rotation for 0.1 seconds to 1 minute, for example, 1 to 5 seconds, due to a user's hand getting caught between the cover 320 and the main body 100 while rotating to the closed position during the first operation, or when closing of the cover 320 is not completed in 0.1 seconds to 1 minute, for example, 1 to 5 seconds after initiation of the first operation, the cover 320 may be rotated to the open position. For example, when a load of a motor 440 of the cover actuator 400 exceeds a preset range during rotation of the cover 320 to the closed position, the cover 320 may be rotated to the open position.

Accordingly, it is possible to prevent overload of the motor 440 described below or occurrence of safety-related accidents in a situation in which the cover 320 cannot move to the closed position.

In addition, the controller 500 may initiate the second operation upon occurrence of at least one of the following: operation of the main body actuator 110 is completed while meeting preset requirements; and an error is detected during operation of the main body actuator 110. For example, the preset requirements may include the following: the main body actuator 110 is operated for a preset chopping time; operation of the main body actuator 110 is completed according to a preset recipe; and the like. For example, the operational error may include overload of the main body actuator 110 or separation of the container 200 from the main body actuator 110 during the first operation.

Accordingly, in response to a single user action of inputting an operation signal to the operation unit 10 (see FIG. 4), the blender 1 performs a series of operations including: rotating the cover 320 to the closed position; chopping ingredients inside the container; stopping operation of the main body actuator 110 upon lapse of a preset chopping time; and rotating the cover 320 to the open position, thereby allowing a user to easily check whether the processing operation is finished even in a noisy home or commercial facility and to take out the container in a quick and safe manner, thus providing high user convenience. Further, when a problem difficult for a user to detect occurs during the operation of processing ingredients inside the container, the blender 1 can automatically stop the processing operation and rotate the cover 320 to the open position, thereby preventing damage to the blender 1 and ensuring user safety.

For example, the controller 500 may control at least one of the first operation and the second operation, including operation of the vacuum motor 600.

Here, the first operation may further include initiating the processing operation inside the container 200 after the cover 320 is rotated to the closed position and the internal space of the container 200 is switched to a vacuum state. In addition, the second operation may further include initiating the opening operation of the cover 320 after the processing operation inside the container 200 is completed while meeting the preset requirements described above and operation of the vacuum motor 600 is completed. Here, "operation of the vacuum motor 600 is completed" may mean that the internal space of the container 200 is maintained in a vacuum state or switched to an atmospheric pressure state after being evacuated to a preset vacuum level. That is, the second operation may include initiating the opening operation of the cover 320 with the internal space of the container maintained in the vacuum state or switched to the atmospheric pressure state after the processing operation inside the container 200 is completed while meeting the preset requirements.

Accordingly, in response to a single user action of inputting an operation signal to the operation unit 10 (see FIG. 4) to perform processing of ingredients inside the container in the vacuum state, the first operation and the second operation can be consecutively performed, thereby providing high user convenience.

The blender 1 may further include a quick switch 700, which will be described further below with reference to FIG. 13 to FIG. 17.

FIG. 5 is a view of a cover actuator according to one embodiment of the present invention, FIG. 6 is a view of an opening/closing detection member according to one embodiment of the present invention, and FIG. 7 to FIG. 12 are views illustrating operation of a torque supplementation member according to one embodiment of the present invention. FIG. 7 and FIG. 8 show the torque supplementation member with the cover in the open position, FIG. 9 and FIG. 10 show the torque supplementation member with the cover placed in an inflection region, and FIG. 11 and FIG. 12 show the torque supplementation member with the cover in the closed position.

Referring to FIG. 5, the cover actuator 400 may include a rotary body 411; 412, an opening/closing detection member 430, a motor 440, and a transmission member 460.

The rotary body 411; 412 may be coupled to the cover 320 to be rotatable in association with the opening/closing operation of the cover 320. For example, the rotary body 411; 412 may be secured to the cover 320 such that the cover 320 is rotated by rotation of the rotary body 411; 412.

In one embodiment, the rotary body may include a first rotary body 411 separated from the transmission member 460 described below and a second rotary body 412 connected to the transmission member 460. Here, the expression "connected to the transmission member" means that the motor 440 of the cover actuator 400 provides power to a corresponding rotary body, and the expression "separated from the transmission member" means that the motor 440 of the cover actuator 400 does not provide power to a corresponding rotary body.

For example, when a gearbox 470 is disposed between the second rotary body 412 and the transmission member 460, the transmission member 460 and the second rotary body can be considered to be connected to each other since power of the motor 440 is provided to the second rotary body 412 through the transmission member 460 and the gearbox 470. That is, power of the motor 440 is transmitted to the second rotary body 412 such that the cover 320 is rotated by rotation of the second rotary body 412 and the first rotary 411, which is disposed opposite the second rotary body 412 with respect to the cover 320, is rotated in conjunction with rotation of the cover 320.

The opening/closing detection member 430 may detect opening/closing of the cover 320.

Referring to FIG. 6, the opening/closing detection member 430 may include at least one rotation sensor 431; 432 disposed on a PCB 433 to detect opening/closing of the cover 320 based on the degree of rotation of the rotary bodies 411, 412.

In one embodiment, the rotation sensor 431; 432 may include a microswitch.

In one embodiment, the opening/closing detection member 430 may include two rotation sensors 431, 432 and a position indicator 434 disposed between the rotation sensors 431, 432 to be movable in conjunction with rotation of the rotary bodies 411, 412. For example, when the position indicator 434 is moved to a position adjoining the first rotation sensor 431, the cover 320 may be detected to be in a fully open position by the controller 500 and, when the position indicator 434 is moved to a position adjoining the second rotation sensor 432, the cover 320 may be detected to be in the closed position by the controller 500, in which a lower surface of the cover 320 adjoins the main body 100 to close the space defined between the cover mount 310 and the main body 100.

The motor 440 may generate power to be transmitted to the second rotary body 412. For example, the power of the motor 440 may be directly transmitted to the second rotary body 412, or may be transmitted to the second rotary body 412 after being controlled through a motor gearbox 450. For example, the motor 440 may be mounted inside the main body 100.

The transmission member 460 may be disposed between the second rotary body 412 and the motor gearbox 450 to transmit power from the motor 440 to the second rotary body 412. Here, the controller 500 may control whether to transmit the power from the motor 440 to the second rotary body 412 through control over the transmission member 460.

For example, the transmission member 460 may be of an electronic type, and may include, for example, an electronic clutch using electromagnetic force. For example, the electronic clutch may include a connection portion 461 that is connected to or disconnected from the motor gearbox 450 to allow or cut off power transmission. The connection portion 461 includes a member configured to be at least partially disconnectable from the motor gearbox 450 to cut off power transmission.

Here, the electronic clutch may be designed such that the connection portion 461 is normally disconnected from the motor gearbox 450. Accordingly, the second rotary body 412 is normally disengaged from the motor 440, such that the cover 320 can be manually rotated by a user.

In addition, the electronic clutch may be designed such that the connection portion 461 is connected to the motor gearbox 450 upon application of electricity. Accordingly, the second rotary body 412 is engaged with the motor 440 upon application of electricity to the electronic clutch, such that the cover 320 can be rotated by driving force of the motor 440.

Here, the opening/closing detection member 430 may be connected to the first rotary body 411. Accordingly, even when the cover 320 is not rotated due to damage to the second rotary body 412 or the like although the motor 440 is driven to provide power to the second rotary body 412, it is possible to accurately detect opening/closing of the cover 320.

The cover actuator 400 may further include a motor gearbox 450, a gearbox 470, and a torque supplementation member 420.

The motor gearbox 450 is connected to the motor 440 to control power transmitted from the motor 440 to the second rotary body 412.

The gearbox 470 may provide the power of the motor 440 to the second rotary body 412 mounted on a shaft different from a shaft on which the motor 440 is mounted. Here, the shaft on which the second rotary body 412 is mounted may be parallel or non-parallel to the shaft on which the motor 440 is mounted. In order to provide a compact design, the blender 1 may have a structure in which the cover actuator 400 is disposed in a space closed by the cover mount 310 and the cover 320. However, if the motor 440 is mounted on the same shaft as the rotary bodies 411, 412, this can cause interference between the cover actuator 400 and the container 200 or can make it difficult to achieve a compact design. Accordingly, with the gearbox 470 transmitting the power of the motor 440 to the shaft different from the shaft of the motor 440, the blender 1 according to the present invention can have a compact design through improvement in space utilization.

The torque supplementation member 420 may supplement the power required for the opening/closing operation of the cover 320. In order to improve noise-blocking capability, the blender 1 may employ a relatively heavy cover 320, the weight of which exceeds a predetermined value. Here, the torque supplementation member 420 allows the cover 320 to be opened or closed with less manual force or with less power of the motor 440.

Referring to FIG. 7 to FIG. 12, the torque supplementation member 420 may include at least one elastic body 421a; 421b. When the cover 320 stays in the closed position or in the open position, the elastic body 421a; 421b is maintained in a compressed position and, during the opening/closing operation of the cover 320, the elastic body 421a; 421b is released from the compressed position to supplement the power required for the opening/closing operation of the cover 320.

Referring to FIG. 9, the torque supplementation member 420 may include an inflection region, which is defined as a compressed position of the elastic body 421a; 421b allowing the cover 320 to be maintained in a stationary position between the open position and the closed position of the cover 320.

That is, when the compressed position of the elastic body 421a; 421b is out of the inflection region, the first rotary body 411 of the cover 320 can be rotated such that the cover 320 is moved to the open position or the closed position by the weight of the cover 320.

In one embodiment, the torque supplementation member 420 may include: a first elastic body 421a and a second elastic body 421b supplementing torque required to open the cover 320 and torque required to close the cover 320, respectively; a first pressing member 422 and a second pressing member 423 pressing the first elastic body 421a and the second elastic body 421b, respectively; and multiple stoppers 424 controlling the range of movement of the first and second elastic bodies 421a, 421b and the first and second pressing members 422, 423.

For example, the first pressing member 422 may be provided at at least one end thereof with a first pressing member end piece 422a, and the second pressing member 423 may be provided at at least one end thereof with a second pressing member end piece 423a. The first pressing member end piece 422a may have a diameter greater than or equal to that of the first elastic body 421a, and the second pressing member end piece 423a may have a diameter greater than or equal to that of the second elastic body 421b. For example, the first pressing member end piece 422a and the second pressing member end piece 423a may have greater diameters than the first elastic body 421a and the second elastic body 421b, respectively, to prevent the first pressing member 422 and the second pressing member 423 from being separated from the first elastic body 421a and the second elastic body 421b.

In one embodiment, the inflection region may include a region of the torque supplementation member 420 in which at least one of the first pressing member end piece 422a and the second pressing member end piece 423a is spaced apart from the stopper 424 by a predetermined distance or less.

Referring to FIG. 7 and FIG. 8, when the cover 320 is in the open position, the first elastic body 421a is maintained in the compressed position since the first pressing member 422 presses the first elastic body 421a corresponding to the degree of rotation of the cover 320 and the cover 320 is designed to have a weight greater than restoring force of the first elastic body 421a. Accordingly, the restoring force of the first elastic body 421a is added to a user's manual force or driving force of the motor 440 applied to the cover to rotate the cover 320, whereby the cover 320 can be rotated more easily.

Referring to FIG. 9 and FIG. 10, when at least one of the first elastic body 421a and the second elastic body 421b is placed in the inflection region in response to rotation of the cover 320, the restoring force of the elastic body 421a; 421b balances the weight of the cover 320, whereby the cover 320 can be maintained in the stationary position between the open position and the closed position.

Here, the position of the elastic body 421a or 421b refers to the position of an end of the elastic body 421a or 421b, for example, the position of a portion of the elastic body 421a or 421b adjoining the first pressing member 422 or the second pressing member 423. Accordingly, when the first elastic body 421*a* and the second elastic body 421*b* are out of the inflection region, the cover 320 can be rotated to the open position or the closed position by the weight thereof.

Referring to FIG. 11 and FIG. 12, when the cover 320 is in the closed position, the second elastic body 421*b* can be maintained in a compressed position since the second pressing member 423 presses the second elastic body 421*b* corresponding to the degree of rotation of the cover 320 and the cover 320 is designed to have a weight greater than restoring force of the first elastic body 421*a*. Accordingly, the restoring force of the second elastic body 421*b* is added to a user's manual force or driving force of the motor 440 applied to the cover to rotate the cover 320, whereby the cover 320 can be rotated more easily.

In addition, the resilience and/or length of the first elastic body 421*a* and the second elastic body 421*b* may be varied depending on the degree of rotation from the closed position or the open position of the cover 320 to the inflection region.

In one embodiment, the blender 1 according to the present invention may employ a structure in which the degree of rotation from the closed position to the inflection region is greater than the degree of rotation from the open position to the inflection region in order to secure a sufficient space to couple or separate the container 200 to or from the upper surface of the main body 100, to achieve a compact design of the blender 1, and to improve noise blocking capability. Accordingly, the second elastic body 421*b* may have a greater length than the first elastic body 421*a*.

As described above, since the blender 1 according to the present invention is configured such that the main body actuator 110 and the cover actuator 400 are operatively connected to each other, the first operation and the second operation described above can be automatically performed in response to a single user action of inputting an operation signal to the operation unit 10 (see FIG. 4) with the container 200 coupled to the upper surface of the main body 100. Here, the operation signal may include pressing the operation button, inputting a voice signal, sending a communication signal via a user terminal, detecting, by a container recognition device described below, that the container 200 is seated on the main body, and the lapse of a preset amount of time after seating the container 200 on the main body 100.

That is, the controller 500 may control the first operation including operating the motor 440 to rotate the second rotary body 412 and operating the main body actuator 110 to initiate the processing operation inside the container in response to detecting, by the opening/closing detection member 430, that the cover 320 is in the closed position.

In addition, when the closing operation of the cover 320 is not completed (that is, the cover 320 is not detected to be in the closed position by the opening/closing detection member 430) in a preset amount of time after initiation of the first operation, the controller 500 may operate the motor 400 to rotate the second rotary body 412 until the cover 320 is detected to be in the open position by the opening/closing detection member 430.

Upon occurrence of at least one of the following: the first operation is completed while meeting the preset requirements; and an operational error of the main body actuator 110 is detected, the controller 500 may further control the second operation including stopping operation of the main body actuator 110 and operating the motor 440 to rotate the second rotary body 412 until the cover 320 is detected to be in the open position by the opening/closing detection member 430.

In addition, when the blender 1 further includes the vacuum motor 600 controlling a vacuum in the internal space of the container 200, as described above, operation of the vacuum motor 600 may be incorporated in the first operation and the second operation.

That is, the first operation may further include operating the main body actuator 110 to initiate the processing operation inside the container 200 when the cover 320 is detected to be in the closed position by the opening/closing detection member 430 and the internal space of the container 200 is detected to be in a vacuum state.

The second operation may further include stopping operation of the main body actuator 110 and operating the motor 440 to rotate the second rotary body 412 until the cover 320 is detected in the open position by the opening/closing detection member 430 when at least one of the following occurs: the first operation is completed while meeting the preset requirements; and an operational error of the main body actuator 110 is detected and when operation of the vacuum motor 600 is completed. Here, completion of operation of the vacuum motor 600 is as described above.

FIG. 13 to FIG. 17 are views illustrating placement of a quick switch according to various embodiments of the present invention.

Referring to FIG. 13 to FIG. 17, the blender 1 may further include a quick switch 700 transmitting a signal for initiating at least one of the first operation and the second operation to the controller 500.

The quick switch 700 may include at least one selected from among a one-touch button transmitting a signal by detecting a user's touch, a voice recognition device transmitting a signal by detecting a user's voice, and a container recognition device detecting whether the container 200 is seated on the main body 100.

Referring to FIG. 13, the quick switch 700 may be disposed on the upper surface of the main body 100, such that a user can touch the quick switch 700 immediately after coupling the container 200 to the upper portion of the main body 100.

Referring to FIG. 14, the quick switch 700 may be disposed in a region in which the container 200 is seated. In this embodiment, the quick switch 700 may be operated at the same time as a user couples the container 200 to the upper portion of the main body 100 or when a preset amount of time elapses after coupling the container 200 to the upper portion of the main body 100.

Referring to FIG. 15, the quick switch 700 may be disposed on a cover handle 301. Referring to FIG. 16, the quick switch 700 may be disposed on an outer surface of the main body 100, for example, on the operation unit 10 (see FIG. 4). Referring to FIG. 17, the quick switch 700 may be disposed on the rotary body 411; 412. However, it should be understood that the present invention is not limited thereto and the quick switch 700 may be disposed at any other suitable place, including on the cover 320, the main body 100, or the cover mount 310, apart from the places shown in the drawings.

FIG. 18 to FIG. 22 show a main body stepped portion and a cover stepped portion according to one embodiment of the present invention. FIG. 18 is a view of the main body stepped portion, FIG. 19 is a view of the cover stepped portion, and FIG. 20 to FIG. 22 are views illustrating coupling between the main body stepped portion and the cover stepped portion according to various embodiments of the present invention.

Referring to FIG. 18 to FIG. 22, the cover 320 includes a cover stepped portion 321 formed on a surface thereof adjoining the main body 100, and the main body 100 includes a main body stepped portion 120 formed on a surface thereof adjoining the cover 320, wherein the cover stepped portion 321 and the main body stepped portion 120 may correspond in shape to each other to isolate the space defined by the cover mount 310 and the cover 320 from an outside environment when the cover 320 is in the closed position, thereby significantly improving noise blocking capability.

Referring to FIG. 18, the main body stepped portion 120 may include a first main body bent portion 121 bent from an outer surface 128 of the main body toward the center of the main body 100, a second main body bent portion 122 bent upward from the first main body bent portion 121, and a third main body bent portion 123 bent from the second main body bent portion 122 toward the center of the main body 100, and a main body protrusion 124 protruding upward from the third main body bent portion 123.

Referring to FIG. 19, the cover stepped portion 321 may include a first bent portion 321a protruding from an inner surface 321d of the cover; a second bent portion 321b bent upward from the first bent portion 321a; and a third bent portion 321c extending from the second bent portion 321b toward the inner surface 321d of the cover.

Referring to FIG. 20, when the cover 320 is in the closed position, a lower surface 321e of the cover is seated on the first main body bent portion 121 and the first bent portion 321a adjoins the third main body bent portion 123. Accordingly, it is possible to effectively prevent noise leakage from the space defined by the cover mount 310, the cover 320, and the main body 100. In addition, it is possible to prevent a liquid spilling out of the container 200 from leaking from the space defined by the cover 320 and the main body 100 to the outside of the cover 320 while preventing damage to the main body due to the spilled liquid.

Referring to FIG. 21, when the cover 320 is in the closed position, the lower surface 321e of the cover is seated on the first main body bent portion 121, the first bent portion 321a adjoins the third main body bent portion 123, and the second bent portion 321b adjoins an outer surface 124a of the main body protrusion. Accordingly, it is possible to effectively prevent noise leakage from the space defined by the cover mount 310, the cover 320, and the main body 100. In addition, it is possible to prevent a liquid spilling out of the container 200 from leaking from the space defined by the cover mount 310, the cover 320, and the main body 100 to the outside of the cover 320 while preventing damage to the main body due to the spilled liquid.

Referring to FIG. 22, when the cover 320 is in the closed position, the lower surface 321e of the cover is seated on the first main body bent portion 121, the first bent portion 321a adjoins the third main body bent portion 123, the second bent portion 321b adjoins the outward surface 124a of the main body protrusion, and an inner surface 321d of the cover adjoins the second main body bent portion 123. Accordingly, it is possible to effectively prevent noise leakage from the space defined by the cover 320 and the main body 100. In addition, it is possible to prevent a liquid spilling out of the container 200 from leaking from the space defined by the cover 320 and the main body 100 to the outside of the cover 320 while preventing damage to the main body due to the spilled liquid.

FIG. 23 to FIG. 26 show the container recognition device according to various embodiments of the present invention.

In response to detecting, by the container recognition device 800, 800a, or 800b, that the container 200 is seated on the main body 100, the controller 500 may initiate the second operation described above. For example, the container recognition device 800, 800a, or 800b may include a sensor such as a limit switch and a reed switch, or may include a sensor such as an NFC sensor, a light receiving sensor, and a light emitting sensor.

Referring to FIG. 23 to FIG. 26, the container recognition device 800, 800a, or 800b may include at least one sensor, for example, an optical sensor, a pressure sensor, and a magnetic sensor.

For example, the container recognition device 800 may include a light emitting element 810 and a light receiving element 820. For example, the light emitting element 810 may include a light emitting member and the light receiving element 820 may include a light receiving sensor. For example, when light emitted from the light emitting element 810 reaches the light receiving element 820 after being reflected by a reflective member (not shown) disposed on a bottom of the container, the controller 500 may detect that the container 200 is seated on the main body 100.

For example, referring to FIG. 23, the light emitting element 810 and the light receiving element 820 may be disposed at a location separated a predetermined distance from a container securing member 101 protruding from the upper surface of the main body 100, or may be disposed between multiple container securing members 101 to improve light emission efficiency and light receiving efficiency.

For example, referring to FIG. 24, the light emitting element 810 and the light receiving element 820 may be disposed on the container securing member 101 to prevent damage to the light emitting element 810 and the light receiving element 820 due to a liquid spilling out of the container 200 while improving space utilization.

For example, the container recognition device 800a or 800b may include at least one of a pressure sensor and a magnetic sensor, wherein the pressure sensor detects that the container is seated on the main body by detecting a weight greater than or equal to a preset value and the magnetic sensor detects that the container is seated on the main body by detecting generation of a magnetic field having a magnitude greater than or equal to a preset value due to a pair of electromagnets disposed on the magnetic sensor and the container, respectively.

Referring to FIG. 25, the container recognition device 800a may be disposed at a location separated a predetermined distance from the container securing member 101 formed on the upper surface of the main body 100, or may be disposed between multiple container securing members 101. The container recognition device 800a may directly contact the bottom of the container to more efficiently detect whether the container 200 is seated on the main body.

Referring to FIG. 26, the container recognition device 800b may be disposed on the container securing member 101 to prevent damage to the container recognition device 800b due to a liquid spilling out from the container 200 while improving space utilization.

Although some embodiments have been described herein, it should be understood that these embodiments are provided for illustration only and are not to be construed in any way as limiting the present invention. The scope of the present invention should be defined by the appended claims and equivalents thereto.

For example, the drawings schematically show each component as a subject to aid in understanding, and the thickness, length, number, and the like of each component shown in the drawings may be different from the actual ones depending on the procedure of creating the drawings. In addition, the material, shape, dimensions, and the like of each component described in the above embodiments are given for illustration only and are not to be construed in any way as limiting the present invention, and various changes can be made by those skilled in the art without substantially departing from the spirit and scope of the present invention.

This application is a US national stage application of International (PCT) Application No. PCT/KR2021/012792, filed Sep. 17, 2021, which claims priority to and the benefit of Korean Patent Publication No. 10-2020-0137233, filed on Oct. 22, 2020 in the Korean Intellectual Property Office, the entire disclosures of which are incorporated herein by reference.

The invention claimed is:

1. A soundproof blender having an automatically opening and closing cover, comprising:
 a main body on which a container receiving a processing object is seated;
 a cover disposed to surround at least a portion of the container, wherein the cover automatically opens or closes at least a portion of the container;
 a main body actuator disposed inside the main body and providing power for processing the processing object inside the container;
 a cover actuator controlling an opening/closing operation of the cover;
 a controller controlling the main body actuator and the cover actuator in an operatively connected manner, wherein the controller is configured to control at least one of:
  a first operation including moving the cover to a closed position and initiating a processing operation inside the container by controlling the cover actuator and the main body actuator; and
  a second operation including stopping an operation of the main body actuator and moving the cover to an open position by controlling the cover actuator and the main body actuator; and
 a quick switch transmitting a signal for initiating at least one of the first operation and the second operation to the controller, wherein the quick switch includes a one-touch button transmitting a signal by detecting a user's touch, a voice recognition device transmitting a signal by detecting a user's voice, and a container recognition device detecting whether the container is seated on the main body.

2. The blender according to claim 1, wherein the second operation includes at least one of:
 operating the cover actuator after stopping operation of the main body actuator;
 operating the cover actuator while stopping operation of the main body actuator; and
 stopping operation of the main body actuator after operating the cover actuator.

3. The blender according to claim 1, wherein the controller is configured to initiate the second operation when at least one of the following occurs:
 operation of the main body actuator is completed while meeting preset requirements; and
 an error is detected during operation of the main body actuator.

4. The blender according to claim 1, further comprising:
 a vacuum motor controlling a vacuum in an internal space of the container.

5. The blender according to claim 4, wherein the first operation may further include initiating the processing operation inside the container after the cover is moved to the closed position and the internal space of the container is switched to a vacuum state, and
 the second operation may further include initiating opening operation of the cover after the processing operation inside the container is completed and operation of the vacuum motor is completed.

6. The blender according to claim 5, wherein the controller may control the main body actuator, the cover actuator, and the vacuum motor in an operatively connected manner.

7. The blender according to claim 1, wherein the controller rotates the cover to the open position in at least one case of:
 when the closing operation of the cover is not completed in a preset amount of time; and
 when a load of a motor of the cover actuator exceeds a preset range during rotation of the cover to the closed position.

8. A soundproof blender having an automatically opening and closing cover, comprising:
 a main body in which a container receiving a processing object therein is seated;
 a main body actuator disposed inside the main body and providing power for processing the processing object inside the container;
 a cover which may open or close, the cover surrounding the container in a closed position;
 a cover actuator controlling an opening/closing operation of the cover; and
 a controller controlling the main body actuator and the cover actuator in an operatively connected manner, wherein the cover actuator includes:
 a rotary body coupled to the cover to be rotatable in association with the opening/closing operation of the cover;
 an opening/closing detection member including at least one rotation sensor to detect opening/closing of the cover based on a degree of rotation of the rotary body; and
 a motor generating power to be transmitted to the rotary body.

9. The blender according to claim 8, wherein the controller is configured to control a first operation including:
 operating the motor to rotate the rotary body; and
 operating the main body actuator to initiate a processing operation inside the container in response to detecting, by the opening/closing detection member, that the cover is in the closed position.

10. The blender according to claim 9, wherein when the closing operation of the cover is stopped for a preset amount of time during the first operation before the cover is detected to be in the closed position by the opening/closing detection member, the controller operates the motor to rotate the rotary body until the cover is detected to be in the open position by the opening/closing detection member.

11. The blender according to claim 9, wherein when at least one of the following occurs: the first operation is completed while meeting preset requirements;
 and an operational error of the main body actuator is detected, the controller is configured to control a second operation including stopping operation of the main body actuator and operating the motor to rotate the rotary body until the cover is detected to be in the open position by the opening/closing detection member.

12. The blender according to claim 8, wherein the cover actuator further includes a torque supplementation member supplementing the power of the motor during the opening/closing operation of the cover.

13. The blender according to claim 12, wherein the torque supplementation member includes an inflection region defined as a compression position of an elastic body in which the cover is maintained in a stationary position between the open position and the closed position of the cover, and wherein when the compression position of the elastic body is out of the inflection region, the rotary body is rotated to move the cover to the open position or the closed position.

14. The blender according to claim 12, wherein the torque supplementation member includes at least one elastic body, wherein, when the cover is in the open position or the closed position, the elastic body is maintained in a compressed position and, during the opening/closing operation of the cover, the elastic body is released from the compressed position.

15. The blender according to claim 11, further comprising:

a quick switch transmitting a signal for initiating at least one of the first operation and the second operation to the controller, wherein the quick switch is disposed on the upper surface of the main body.

16. A soundproof blender having an automatically opening and closing cover, comprising:

a main body in which a container receiving a processing object therein is seated;

a main body actuator disposed inside the main body and providing power for processing the processing object inside the container;

a cover which may open or close, the cover surrounding the container in a closed position;

a cover actuator controlling an opening/closing operation of the cover; and a vacuum motor making an internal space of the container into a vacuum state;

wherein the cover actuator includes:

a rotary body coupled to the cover to be rotatable in association with the opening/closing operation of the cover; and a motor generating power to be transmitted to the rotary body, and wherein the blender further comprises a controller configured to control the main body actuator, the cover actuator, and the vacuum motor in an operatively connected manner, wherein the controller is configured to control at least one of:

a first operation including moving the cover to a closed position and initiating a processing operation inside the container by controlling the cover actuator and the main body actuator, wherein the first operation may further include initiating the processing operation inside the container after the internal space of the container is switched to a vacuum state; and a second operation including stopping an operation of the main body actuator and moving the cover to an open position by controlling the cover actuator and the main body actuator, wherein the second operation may further include initiating opening operation of the cover after an operation of the vacuum motor is completed.

\* \* \* \* \*